US010514552B2

(12) United States Patent
Chen et al.

(10) Patent No.: US 10,514,552 B2
(45) Date of Patent: Dec. 24, 2019

(54) AUTO STEREOSCOPIC THREE-DIMENSIONAL PANEL DISPLAY SYSTEMS AND METHODS SUPPORTING IMPROVED FIDELITY DISPLAY TO MULTIPLE SIMULTANEOUS VIEWERS

(71) Applicant: Duan-Jun Chen, East Brunswick, NJ (US)

(72) Inventors: Duan-Jun Chen, East Brunswick, NJ (US); Albert Chen, East Brunswick, NJ (US)

( * ) Notice: Subject to any disclaimer, the term of this patent is extended or adjusted under 35 U.S.C. 154(b) by 50 days.

(21) Appl. No.: 15/777,644

(22) PCT Filed: Jun. 17, 2016

(86) PCT No.: PCT/US2016/038143
§ 371 (c)(1),
(2) Date: May 18, 2018

(87) PCT Pub. No.: WO2017/087033
PCT Pub. Date: May 26, 2017

(65) Prior Publication Data
US 2018/0348534 A1 Dec. 6, 2018

Related U.S. Application Data

(60) Provisional application No. 62/391,824, filed on May 11, 2016, provisional application No. 62/386,540, (Continued)

(51) Int. Cl.
*G02B 27/22* (2018.01)
*G02B 27/12* (2006.01)
(Continued)

(52) U.S. Cl.
CPC ......... *G02B 27/225* (2013.01); *G02B 5/1842* (2013.01); *G02B 27/1086* (2013.01);
(Continued)

(58) Field of Classification Search
None
See application file for complete search history.

(56) References Cited

U.S. PATENT DOCUMENTS 5,982,553 A   11/1999 Bloom et al.
2003/0039031 A1  2/2003 Redert
(Continued)

OTHER PUBLICATIONS

Perlin et al., "An Autostereoscopic Display," *Proceedings of the 27th Annual Conference on Computer Graphics and Interactive Techniques,* pp. 319-326 (2000) (online); Media Research Laboratory, Dept. of Computer Science, New York University; URL: http://www.mrl.nyu.edu/perlin/.

(Continued)

*Primary Examiner* — Edward J Glick
*Assistant Examiner* — Anthony G Quash
(74) *Attorney, Agent, or Firm* — John C. Pokotylo; Pokotylo Patent Services

(57) ABSTRACT

The problem of 3D panel display systems either (a) requiring special glasses to separate left and right images, or (b) having auto-stereoscopic 3D with compromised fidelity, is solved by providing, for each of a plurality of left and right sub-pixels, both (1) means for separating the left and right image signals (e.g., alternating wedges, prisms, off-axis self-sourcing pixels, etc.), and (2) means for multiplexing the separated left and right signals to a plurality of viewers (e.g., gratings, such as amplitude gratings, phase gratings, etc.), such that (1) the left image is provided to a plurality of virtual volume apertures ($VVA_L$) containing positions of the left eyes of the plurality of viewers, and (2) the right image is provided to a plurality of virtual volume apertures ($VVA_R$) containing positions of the right eyes of the plurality of viewers. Glass-free 3D systems consistent with the present invention may treat far field optical signals from the display panel as electro-magnetic waves (and therefore treat diffrac- (Continued)

tion and interference properties as significant, dominating far field optical distribution) rather than as rays consistent with geometric optical theory.

23 Claims, 27 Drawing Sheets

Related U.S. Application Data filed on Dec. 5, 2015, provisional application No. 62/386,196, filed on Nov. 20, 2015.

(51) Int. Cl.
    *G02B 27/10*     (2006.01)
    *G02B 5/18*     (2006.01)
    *H04N 13/324*     (2018.01)

(52) U.S. Cl.
    CPC ....... *G02B 27/126* (2013.01); *G02B 27/2214* (2013.01); *H04N 13/324* (2018.05)

(56) References Cited

U.S. PATENT DOCUMENTS

| 2008/0068715 | A1 | 3/2008 | Magarill |
| 2009/0040426 | A1 | 2/2009 | Mather et al. |
| 2009/0102915 | A1 | 4/2009 | Arsenich |
| 2013/0114007 | A1 | 5/2013 | Lin et al. |

OTHER PUBLICATIONS

PCT International Search Report ("ISR"), dated Sep. 13, 2016, to corresponding International Application No. PCT/US16/38143 (3 pgs.) and Written Opinion of the International Search Report; dated Sep. 13, 2016 (10 pgs.).

PCT Notification of Transmittal of International Preliminary Report on Patentability ("IPRP"), dated Sep. 11, 2018, to corresponding International Application No. PCT/US16/38143 (34 pgs.).

920

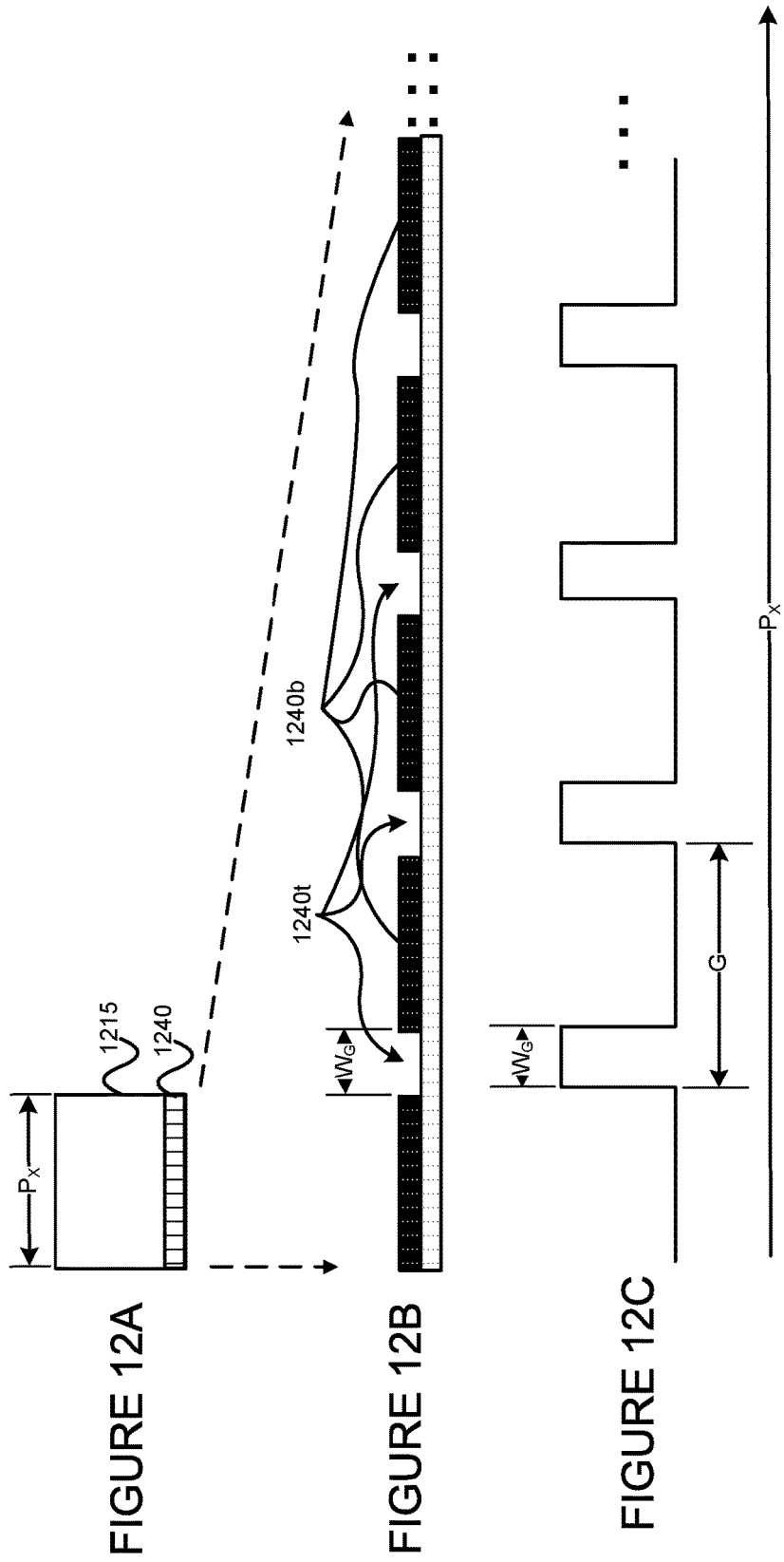

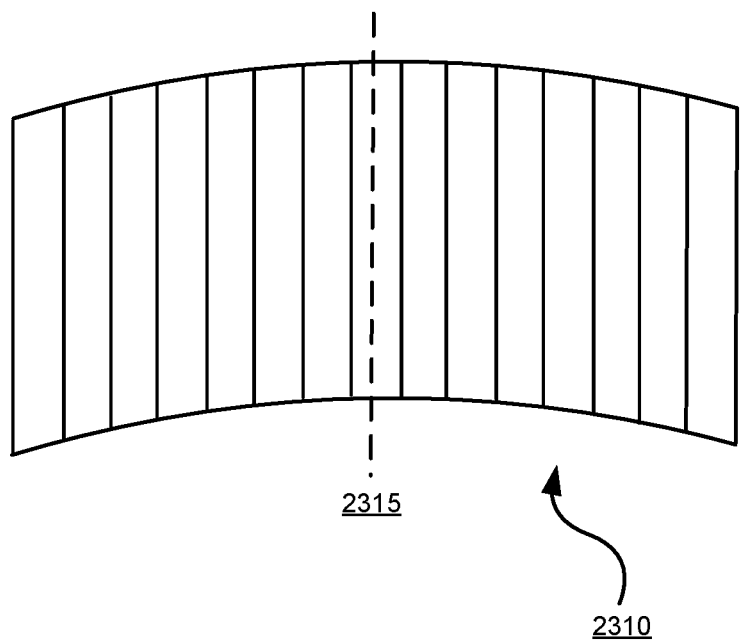
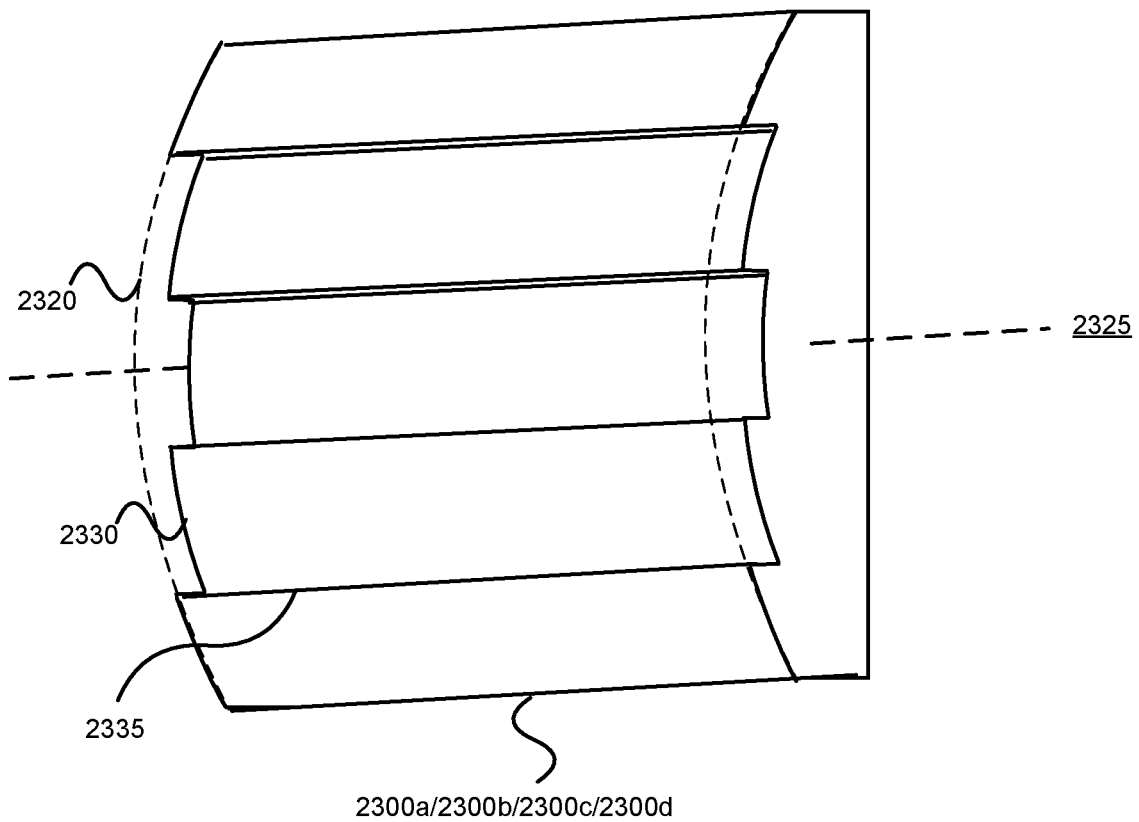
FIGURE 23

2610

2620

| L_RED | R_RED |
| L_GREEN | R_GREEN |
| L_BLUE | R_BLUE |

2630

| L_RED | L_GREEN | L_BLUE |
| R_RED | R_GREEN | R_BLUE |

2720

2710

2730

2910

2930

2810

2820

AUTO STEREOSCOPIC THREE-DIMENSIONAL PANEL DISPLAY SYSTEMS AND METHODS SUPPORTING IMPROVED FIDELITY DISPLAY TO MULTIPLE SIMULTANEOUS VIEWERS

§ 1. RELATED APPLICATIONS

This application claims benefit to each of U.S. Provisional Application Ser. No. 62/386,196 (referred to as "the '196 provisional" and incorporated herein by reference), titled "GLASS-FREE 3D DISPLAY SYSTEM," filed on Nov. 20, 2015 and listing Duan-Jun Chen as the inventor, U.S. Provisional Application Ser. No. 62/386,540 (referred to as "the '540 provisional" and incorporated herein by reference), titled "AUTO STEREOSCOPIC 3D TV SYSTEM USING MULTI-FOCUSING PANEL," filed on Dec. 5, 2015 and listing Duan-Jun Chen as the inventor, and U.S. Provisional Application Ser. No. 62/391,824 (referred to as "the '824 provisional" and incorporated herein by reference), titled "GLASS-FREE 3D DISPLAY PANEL," filed on May 11, 2016 and listing Duan-Jun Chen as the inventor. The scope of the present invention is not limited to any requirements of the specific example embodiments described in '196, '540 and '824 provisional applications.

§ 2. BACKGROUND OF THE INVENTION

§ 2.1 Field of the Invention

The present invention concerns three-dimensional ("3D") panel display systems and methods. In particular, the present invention concerns auto-stereoscopic (e.g., glass-free) 3D display systems and methods.

§ 2.2 Background Information

U.S. Pat. No. 5,301,062 (incorporated herein by reference and referred to as "Takahasi") discusses a display having a diffraction grating pattern and includes: (a) a flat substrate; and (b) at least one dot formed on a surface of the flat substrate, the dot being formed by a diffraction grating pattern as an aggregate of a plurality of curves obtained by translating a curve.

U.S. Pat. No. 5,754,342 (incorporated herein by reference and referred to as "Ohnishi") discusses a two-dimensional diffraction grating (5, 14) having a plurality of grating elements arranged in two directions (X, Y) different from each other. The grating elements in one of the directions (X, Y) have a substantially uniform grating height (h) when viewed in an arbitrarily chosen section along such one of the directions (X, Y) and, also, the grating elements in the other of the directions (X, Y) have a substantially uniform grating height (h) when viewed in an arbitrarily chosen section along the other of the directions (X, Y). An image display device includes an image display unit (4) including a plurality of pixels (10) patterned in a dot matrix in two dimensions and having a path (2) of travel of imagewise rays of light, and the two-dimensional diffraction grating (5) disposed on the path (2) of travel of the imagewise rays of light leading from the image display unit (4). An imaging device also includes the two-dimensional diffraction grating (14) disposed between a photo taking lens (12) and a solid-state imaging element (11).

U.S. Pat. No. 6,943,788 (incorporated herein by reference and referred to as "Tomono") provides a three-dimensional image display apparatus is provided. The three-dimensional image display apparatus, which includes an image forming display flat panel and a lens unit that is disposed in front of the image forming display flat panel and converts images projected from the image forming display flat panel into three-dimensional images. The lens unit includes a set of diffractive optical devices, each of which includes a plurality of diffractive grating elements that are parallel to one another and are disposed above the image forming display flat panel. Accordingly, the three-dimensional image display apparatus uses diffractive optical devices, each of which is composed of diffractive grating elements having very narrow widths, thereby displaying two- and three-dimensional images of good quality, wherein a width of each adjacent diffractive grating element is smaller than a width of the adjacent grating element that is closer to the center of the diffractive optical device.

U.S. Pat. No. 8,854,560 (incorporated herein by reference and referred to as "Chen") proposes an auto-stereoscopic display device is proposed. The auto-stereoscopic display device includes a display panel and a liquid crystal lens. The liquid crystal lens includes a first electrode layer and a second electrode layer. The first electrode layer includes a plurality of first electrode stripes arranged in parallel along pixel units and extending in a first or second direction. The second electrode layer includes a plurality of second electrode stripes extending slantingly relative to the plurality of first electrode stripes and being arranged in parallel. A liquid crystal lens and a driving method thereof are also proposed. Based on the present invention, a first lenticular lens unit is generated and arranged along the plurality of second electrode stripes for the 3D display mode, and a second lenticular lens unit is generated and arranged along the plurality of first electrode stripes for the 2D display mode. The invention can fulfill the 3D-mode requirement and enhance brightness and luminance in the 2D mode.

Nordin, Gregory P., Jones, Michael W., Kulick, Jeffrey H., Lindquist, Robert G., and Kowel, Stephen T., The paper "Three-Dimensional Display Utilizing a Diffractive Optical Element and an Active Matrix Liquid Crystal Display," *Opt. Eng.*, 35(12) pp. 3404-3412 (December 1996). (Incorporated herein by reference) discusses the design, construction, and performance of the first real-time autostereoscopic three-dimensional (3-D) display based on the partial pixel 3-D display architecture. The primary optical components of the 3-D display are an active-matrix liquid crystal display and a diffractive optical element (DOE). The display operates at video frame rates and is driven with a conventional VGA signal. Three-dimensional animations with horizontal motion parallax are readily viewable as sets of stereo images. This is accomplished by dividing each pixel into spatially distinct regions (referred to as "partial pixels"). There is a one-to-one correspondence between partial pixels and virtual viewing slits. Formation of the virtual viewing slits by diffraction from the partial pixel apertures is experimentally verified. The measured contrast and perceived brightness of the display are excellent, but there are minor flaws in image quality due to secondary images. The source of these images and how they may be eliminated is discussed. The effects of manufacturing-related systematic errors in the DOE are also analyzed.

§ 2.2.1 Glass-Based 3D Display 3D panel displays using separate left and right sub-pixels and special glasses worn by spectators for separating left and right image signals are known. Some 3D displays have used glasses with red and blue filters to separate left and right image signals. More recent 3D displays have used vertically and horizontally polarized lenses to separate left and right image signals, and even left-handed and right-handed circularly polarized lenses to separate left and right image signals. So called "active-glass" systems activate left and right displays in an alternating manner (e.g., using electronic shutters).

However, people often prefer not to have to wear the glasses required for glass-based 3D display systems, especially people who wear prescription glasses and/or people with atypical facial features. Therefore, it would be useful to provide a 3D display system that does not require special glasses to separate left and right images.

§ 2.2.2 Glass-Free (Auto-Stereoscopic) 3D Display

Some known systems use a parallax barrier, or an arrangement of lenticular lenslets to provide glass-free 3D display. In some systems, Fresnel lenticular lenslets are used to reduce the thickness of the display.

Although such systems can provide glass-free 3D display, their fidelity has been limited by crosstalk between left and right images, blurry objects, and limited depth of field, especially when multiple viewing positions are considered. For example, such glass-free 3D display systems do not always separate the left and right image signals perfectly. That is, some of the left image signal can sometimes reach the right eye, and vice-versa. This may be referred to as "crosstalk". It would be useful to have a 3D display system with reduced crosstalk, or without any crosstalk.

In view of the foregoing, it would be useful to provide a 3D display system which does not require viewers to wear any glasses in order to separate left and right images, and which can be viewed simultaneously and with improved fidelity (e.g., better image sharpness, better contrast, and/or better 3D effects with increased depth of fields) and improved viewer comfort, in proper 3D, by more than one viewer.

§ 3. SUMMARY OF THE INVENTION

The present inventor believes that the main problem with current glass-free 3D panel display systems is that they use geometric optical design based on ray tracing. Unfortunately, however, when viewers are several meters or even farther away (at far field) from the display screen, typical geometric ray-tracing designs cause large aberrations to occur. The problem of 3D panel display systems either (a) requiring special glasses to separate left and right images, or (b) having auto-stereoscopic 3D with compromised fidelity, is solved by providing, for each of a plurality of left and right sub-pixels, both (1) means for separating the left and right image signals (e.g., alternating wedges, prisms, off-axis self-sourcing pixels, etc.), and (2) means for multiplexing the separated left and right signals to a plurality of users (e.g., gratings, such as amplitude gratings, phase gratings, etc.), such that (1) the left image is provided to a plurality of virtual volume apertures ($VVA_L$) containing positions of the left eyes of the plurality of users, and (2) the right image is provided to a plurality of virtual volume apertures ($VVA_R$) containing positions of the right eyes of the plurality of users. Glass-free 3D systems consistent with the present invention may treat far field optical signals from the display panel as electro-magnetic waves (and therefore treat diffraction and interference properties as significant, dominating far field optical distribution) rather than as rays consistent with geometric optical theory.

In some example embodiments consistent with the present invention, the means for separating and the means for multiplexing are selected such that no $VVA_L$ shares any volume with any $VVA_R$ (i.e., has no crosstalk) at a given distance from the 3D display panel.

In some example embodiments consistent with the present invention, a center point of a $VVA_L$ is separated from a center point of a corresponding $VVA_R$ by a distance of 60 mm or 2.25 inches (±10%). This distance may be referred to as the inter-pupil distance between two eyes of an average person ($D_{pp}$).

In some example embodiments consistent with the present invention, a center point of a $VVA_L$ (or $VVA_R$) is separated from a center point of a $VVA_L$ (or $VVA_R$) of an adjacent person by 20 inches or 0.5 meters (±10%), and this distance may be referred to as viewer-to-viewer distance ($D_{vv}$).

In some example embodiments consistent with the present invention, a duty cycle of the amplitude-type grating is selected to match a predetermined number of viewers.

In some example embodiments consistent with the present invention, a peak-to-peak height of the phase-type grating ($H_{pp}$) is selected to match a predetermined number of viewers.

In some example embodiments consistent with the present invention, a spacing (or "pitch") of the grating is selected based on a wavelength of a color (e.g., red, green, blue, etc.) of a sub-pixel.

In some example embodiments consistent with the present invention, a means incorporated for providing focused left and right virtual volumetric apertures (VVAL and VVAR) encompass a spherical concave display panel, a piecewise-flattened spherical concave display panel, a concave cylindrical display panel that is coupled at its front-side with a cross orientated Fresnel-style convex cylindrical lens, or a flat display panel that is coupled at its front-side with a convex simplex lens, an achromatic duplex lens, an triplex achromatic lens, a convex Fresnel field lens, or two cross-orientated Fresnel-Style cylindrical lens placed in tandem, etc.

§ 4. BRIEF DESCRIPTION OF THE DRAWINGS

FIGS. 12A-12C illustrate gratings, incorporated at the front-side of a sub-pixel, and FIGS. 12D and 12E illustrate example sub-pixel elements with different gratings provided on a wedged face.

FIGS. 22A, 22D and 22E illustrate another example flat display panel incorporating front-side focusing means via two cross-oriented Fresnel-style cylindrical lens in tandem;

FIG. 23 illustrates yet another focusing panel system.

Referring to FIGS. 26A-26C, 27A-27C, 28A and 28B and 29A and 29B illustrate example sub-pixel geometries and sub-pixel array geometries.

Figure 30:
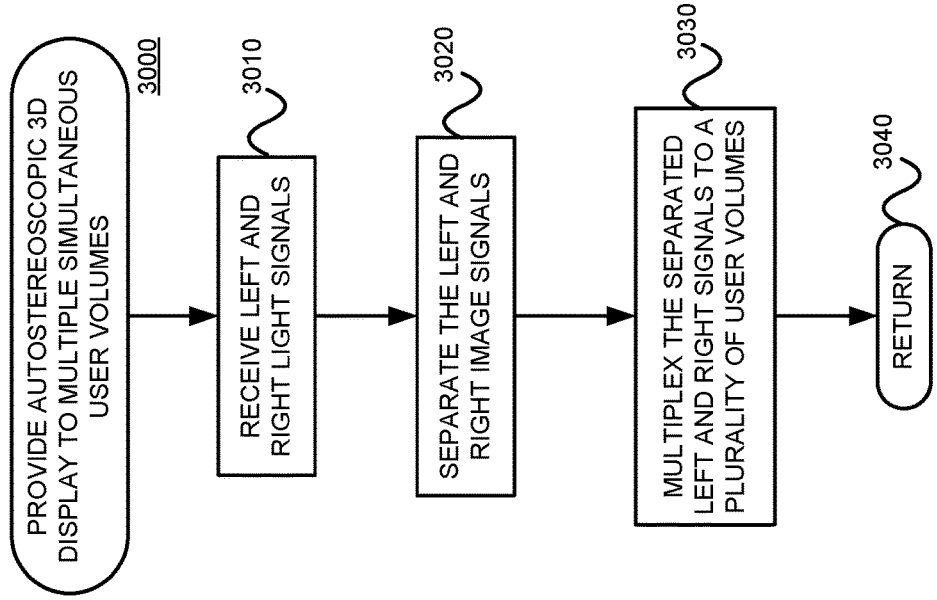

FIG. 30 illustrates an example method for supporting an auto-stereoscopic 3D display to multiple simultaneous viewers (or view points, also referred to as "hypothetical users").

Figure 31:
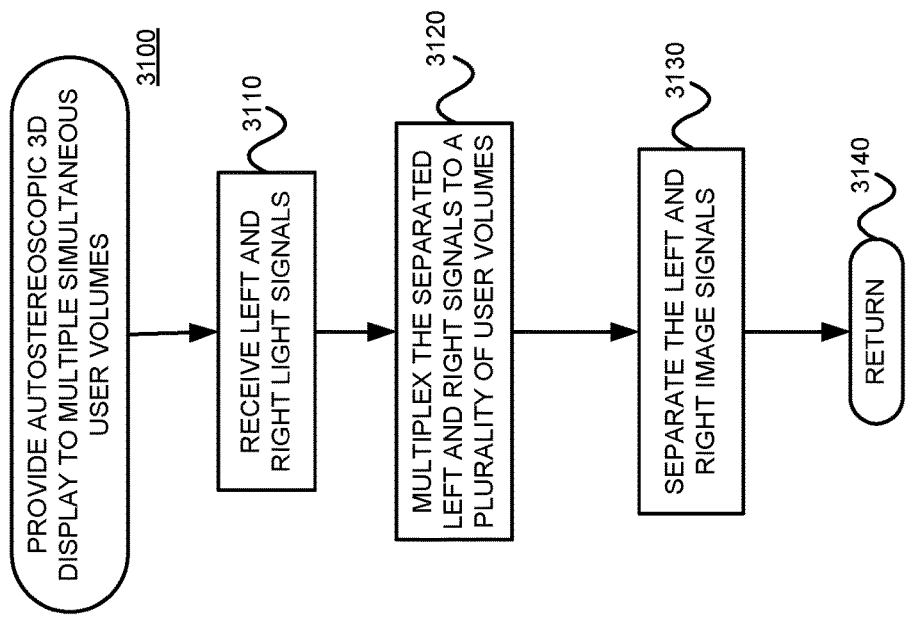

FIG. 31 illustrates another example method for supporting an auto-stereoscopic 3D display to multiple simultaneous viewers (or view points, also referred to as "hypothetical users").

§ 5. DETAILED DESCRIPTION

The present invention may involve novel methods, apparatus, message formats, and/or data structures for providing a glass-free 3D panel display. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventor regards his invention as any patentable subject matter described.

Figure 1A:
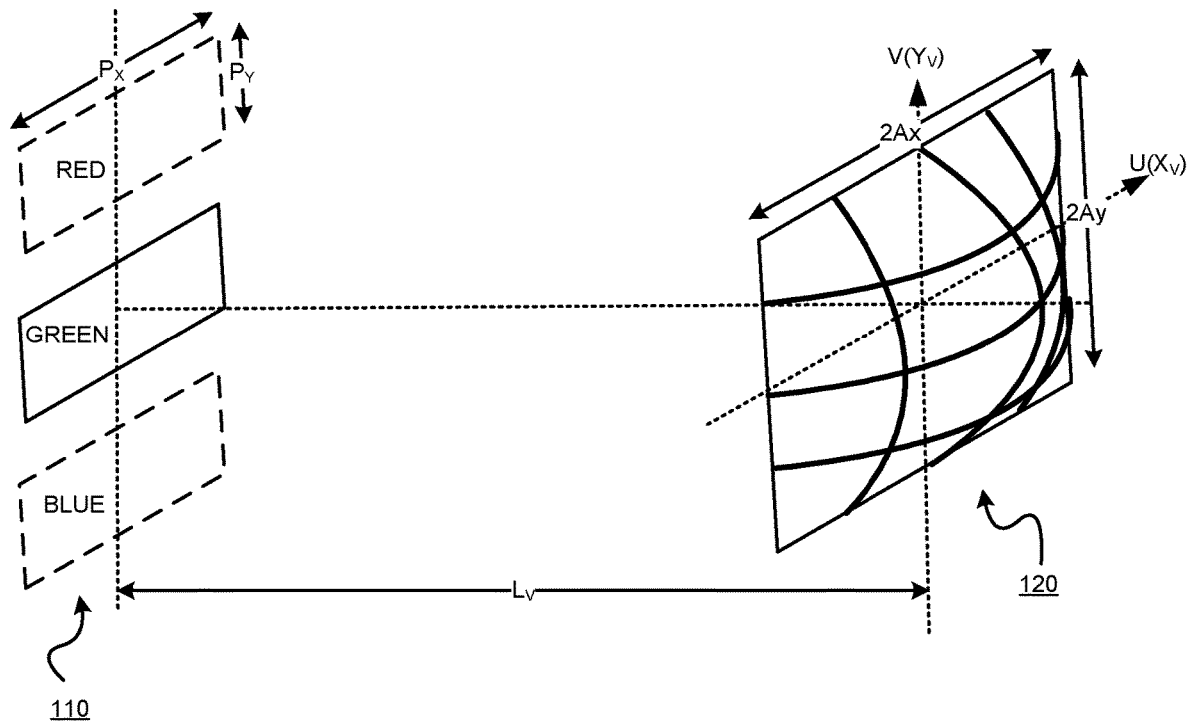
FIGS. 1A and 1B illustrate the concept of a focus point (which is really a volume, referred to as a virtual volumetric aperture ("VVA")).

§ 5.1 Example System for Auto-Stereoscopic 3D Display to Multiple Simultaneous Viewers FIG. 1A illustrates the concept of a focus point (which is really a volume, referred to as a virtual volumetric aperture ("VVA")). Red, green and blue pixels (e.g., RED/GREEN/BLUE LEDs, or LCDs back-illuminated by RED/GREEN/BLUE LEDs or by RED/GREEN/BLUE laser diodes ("LDs")) 110 each have a horizontal dimension ($P_x$) and a vertical dimension ($P_y$). The pixels 110 are spaced from the VAA 120 by a distance $L_v$. The dimensions of the VAA are related to the dimensions of the pixels, the wavelength of the light ($\lambda_0$) and the distance $L_v$ as follows:

$$A_x = \lambda_0 L_v / P_x; \text{ and}$$

$$A_y = \lambda_0 L_v / P_y$$

Wherein at $U = A_x/2$ or $V = A_y/2$, it defines the cutoff amplitude of $Amp = 2/\pi (= 0.64)$ and a $$\text{cutoff power of Power} = \left(\frac{2}{\pi}\right)^2 (= 0.41).$$

Here the scales of the amplitude and the power are both defined relatively, by normalizing both quantities to Unity at the central maximum location, i.e., Amp (0,0)=1, and Power (0,0)=1.

The above results are derived from the following two-dimensional distribution function:

$$Amp = \frac{\sin(\pi P_x X_v / \lambda_0 L_v)}{(\pi P_x X_v / \lambda_0 L_v)} * \frac{\sin(\pi P_x Y_v / \lambda_0 L_v)}{(\pi P_x Y_v / \lambda_0 L_v)}$$

Wherein $X_v$ and $Y_v$ are transverse coordinates defined in the viewers' real physical space in the horizontal and vertical directions (respectively, see FIG. 1), and the origin of ($X_v$, $Y_v$) is set at the center point of the $0^{th}$ order VVA. If we further define two scaling factors as $$K_x = (\pi P_x / \lambda_0 L_v) \text{ and } K_y (\pi P_y / \lambda_0 L_v)$$

And let $$U = K_x X_v \text{ and } v = K_y Y_v$$

Then the above two dimensional distribution function assumes the following simple form $$Amp = \frac{\sin(U)}{U} * \frac{\sin(V)}{V}$$

Wherein U and V are two angular coordinates that are proportional to, and scaled up from, the viewer's space dimensions $X_v$ and $Y_v$ respectively. Apparently, at the four sides from the center of the diffraction pattern at $U=\pm A_x$, and $V=\pm A_y$, the distribution assumes the ideal zero value.

Figure 1B:
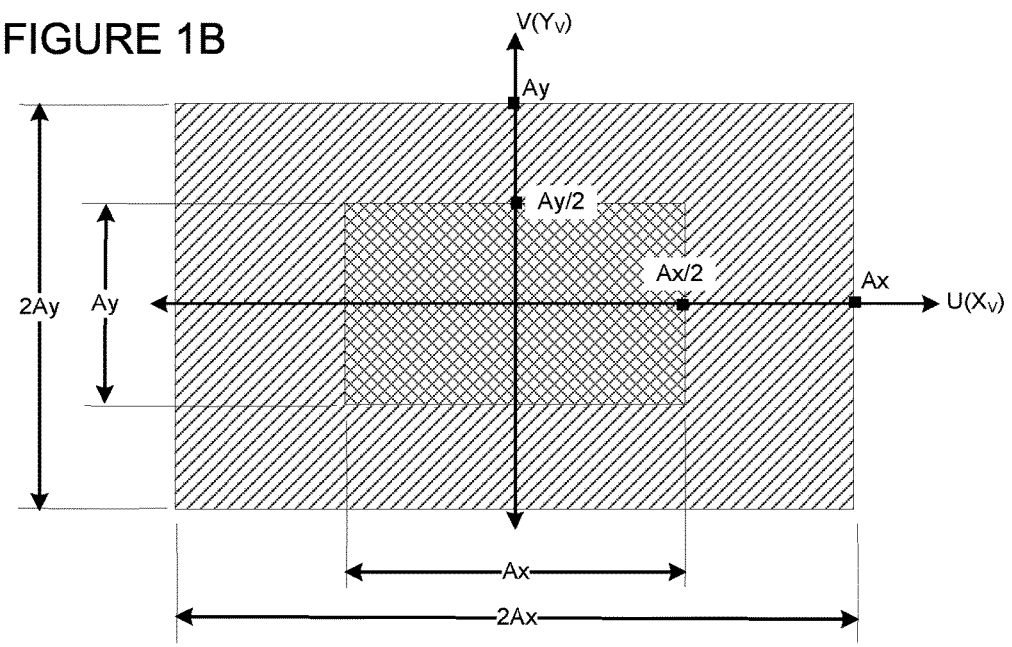

In insert 1100 of FIG. 1B, the cross-shaded rectangular area ($A_x \times A_y$) depicts the inner part of the far-field diffraction region within the cutoff amplitude. We will refer this rectangular area ($A_x \times A_y$) as effective size, or effective dimension, of the VVA. Also, in insert 1100 of FIG. 1, single parallel shaded rectangular area ($2A_x \times 2A_y$) depicts the larger part of the far-field diffraction region within the four-side boundaries where the distribution reaches the ideal zero (0) value. Notice the power distributions outside off the effective dimension ($A_x \times A_y$) are noticeably small (less than 41%). Hereafter, we will refer this larger rectangular area ($2A_x \times 2A_y$) as the doubled-size, or doubled-dimension, of the VVA. This doubled-size of the VVA will be useful when we seek a robust design criterion for reliable zero-overlapping visual effects between the left-side VVA and the right-side VVA (see FIGS. 6 and 9, and the related descriptions, respectively.)

See, e.g., the texts J. W. Goodman, *Introduction to Fourier Optics: 3rd Ed.* (2005, Roberts & Company Publishers, Greenwood Village, Colo.), and F. T. S. Yu, *Optical Information Processing* (1983, John Wiley & Sons, Inc.), both incorporated herein by reference.) Since $\lambda_{blue}$ is about 450 nm, $\lambda_{green}$ is about 520 nm, and $\lambda_{red}$ is about 620 nm, we assume that $\lambda_0$ is about 500 nm for our typical example analysis. If $L_v$ is set to 3 m (as a typical viewing distance for an LCD panel at a home theater), the example relationships between the dimensions of the pixel components and the dimensions of the VVA include:

if $P_x=2$ mm, then $A_x=0.75$ mm;
if $P_x=0.5$ mm, then $A_x=3$ mm;
if $P_x=0.2$ mm, then $A_x=7.5$ mm;
and
if $P_y=1$ mm, then $A_y=1.5$ mm;
if $P_y=0.3$ mm, then $A_y=5$ mm;
if $P_y=0.1$ mm, then $A_y=15$ mm.

Further, if $L_V$ is set to 30 m (as a typical viewing distance for a LED illuminated billboard), the example relationships between the dimensions of the pixel components and the dimensions of the VVA include:

if $P_x=20$ mm, then $A_x=0.75$ mm;
if $P_x=5$ mm, then $A_x=3$ mm;
if $P_x=2$ mm, then $A_x=7.5$ mm;
and
if $P_y=10$ mm, then $A_y=1.5$ mm;
if $P_y=3$ mm, then $A_y=5$ mm;
if $P_y=1$ mm, then $A_y=15$ mm;

Notice that as the pixel dimensions decrease, the viewing VVA size increases. Naturally, other values are possible.

Figure 2:
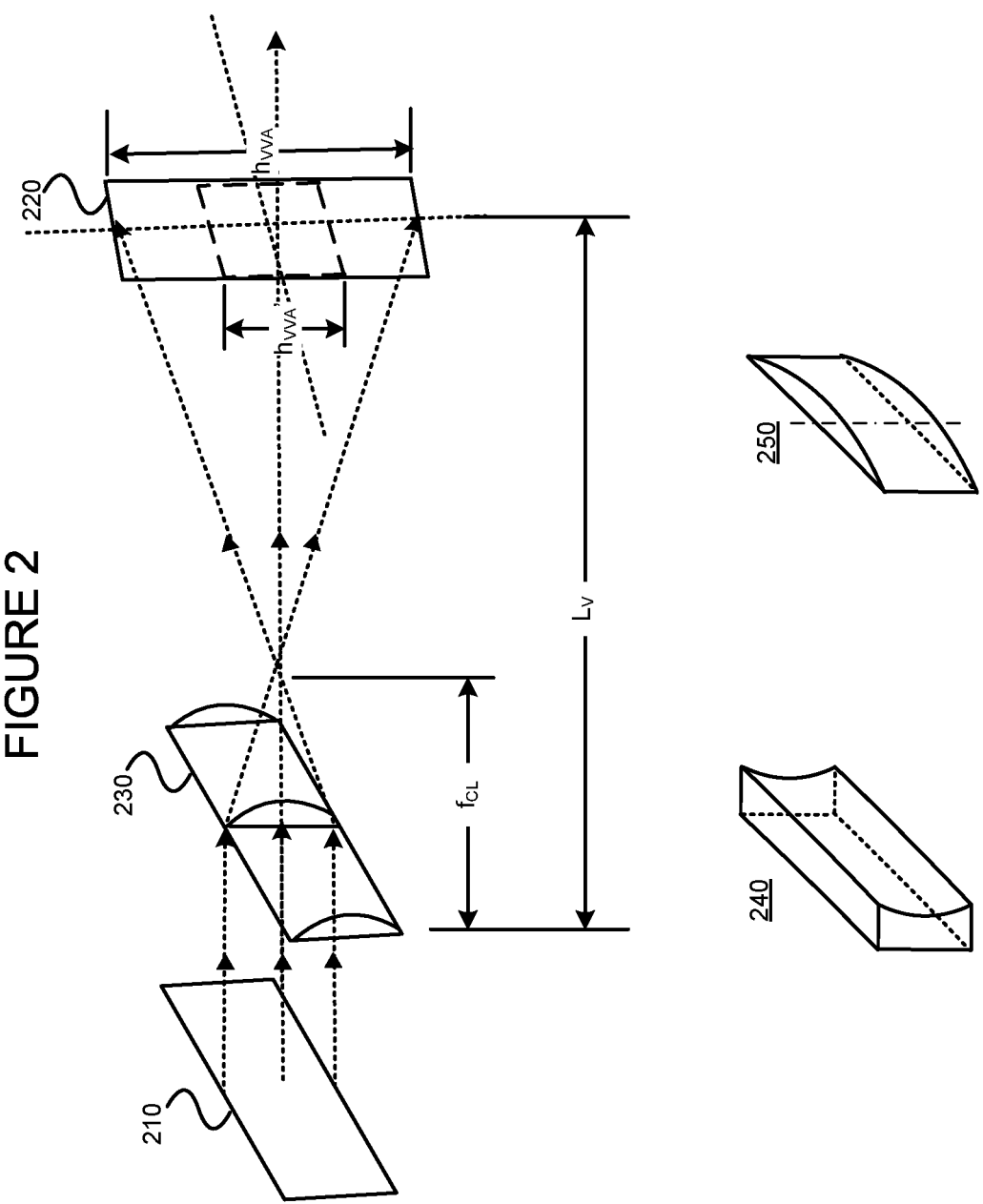
FIG. 2 illustrates one way to make the VVA taller, thereby permitting different people with different eye levels to view the 3D images.

When projecting left and right images to different users seated in a row, but having different eye levels, it is useful to be able to make the VVA larger in the vertical direction (also referred to as "taller"). FIG. 2 illustrates one way to make the VVA taller, thereby permitting different people with different eye levels to view the images. More specifically, a simple lenticular lens 230 arranged between the pixel element 210 and the VVA 220 can be used to expand the VVA in the vertical direction. (Compare the dashed lines with the solid lines at the right of FIG. 2.) Assuming that $f_{CL}$ is the focal length of the lenticular lens 230 and Lv is the display distance to a viewer, the expanded VVA height ("$h_{VVA}$") can be expressed as follows:

$$h_{VVA} = P_y * \frac{L_v - f_{CL}}{f_{CL}}$$

$$= \left(\frac{L_v}{f_{CL}} - 1\right) P_y$$

If it is assumed that $L_V \gg f_{CL}$, then this becomes:

$$h_{VVA} = \frac{L_V}{f_{CL}} * P_y$$

Alternatively, lenticular lens 230, which is shown convex in shape, can be replaced by a concave-type lenticular lens 240. When absolute value of the focal length (negative in value) of the concave-type lenticular lens 240 is also assigned the same value $f_{CL}$, concave-type lenticular lens 240 will perform the same beam-expanding function as the convex-type lenticular lens 230. Additionally, lenticular lens 250 can be inserted in the immediate front or rear side of lenticular lens 230. Notice that lenticular lens 250 has a focusing power for beams in the horizontal dimension. In the event that the optical beam directly immerged from the pixel front face is not as desired, this lenticular lens 250 can be utilized to better collimate or modulate the output beam shape.

Note that when $h_{VVA}$ is high (e.g., $h_{VVA}=6''$), the same pairs of VVAs can accommodate a group of people seated along one row, even if the people have different eye levels. If the distance between pupils of a person's eyes ("$D_{PP}$") is typically 60 mm, doubled-size of the VVA in the horizontal dimension ("$2W_{VVA}=2A_x$") can be about 38 mm (1.5") or less, so that crosstalk between left and right images can be eliminated or greatly reduced.

Figure 3A:
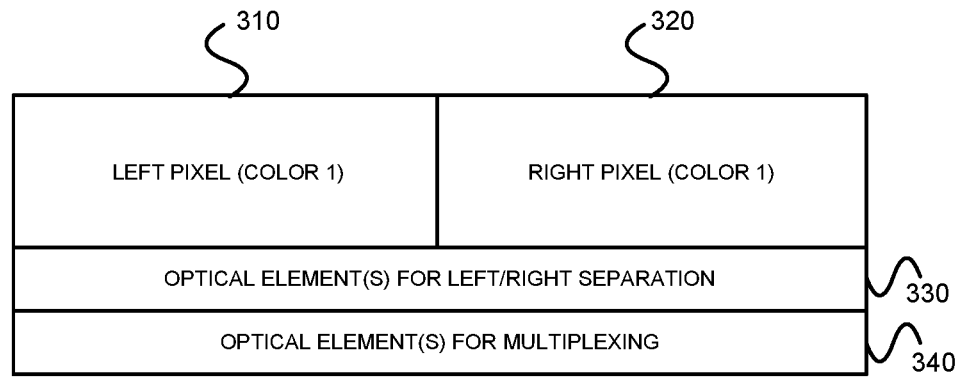
FIGS. 3A and 3B are simplified diagrams illustrating two different basic arrangements of elements in systems for supporting an improved fidelity auto-stereoscopic 3D display to multiple simultaneous viewers.
Figure 3B:
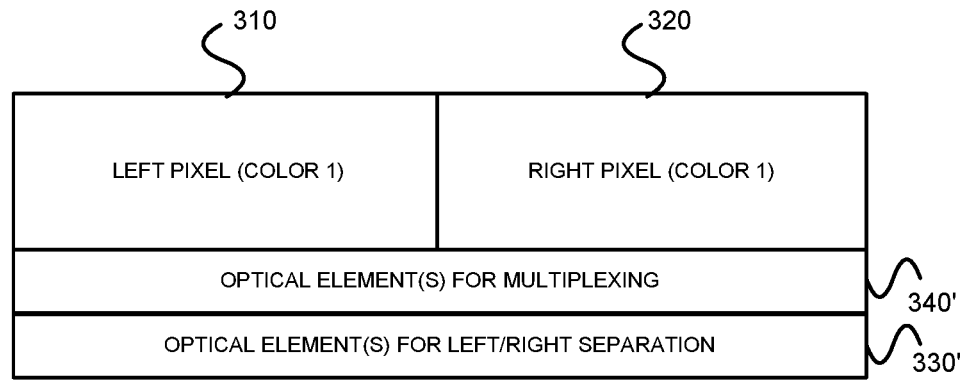

FIGS. 3A and 3B are simplified diagrams illustrating two different basic arrangements of elements in systems for supporting an improved fidelity auto-stereoscopic 3D display to multiple simultaneous viewers. As shown in the first example system 300A of FIG. 3A, optical element(s) for left/right separation 330 may be provided between left and right sub-pixels of a given color 310 and 320, and optical element(s) for multiplexing the image 340. Alternatively, as shown in an alternative example system 300B of FIG. 3B, the optical element(s) for multiplexing the image 340' may be provided between left and right sub-pixels of a given color 310 and 320, and the optical element(s) for left/right separation 330'. Either arrangement 300A or 300B is repeated for each color of each left/right sub-pixel pair. As the wedged angle is normally small ($\varphi \ll 1$), the present inventor believes that both the example system 300A of FIG. 3A and the example system 300B of FIG. 3B would work equally (or approximately equally) well with the application of either back-illuminated LCD pixels/sub-pixels or self-illuminated LED pixels/sub-pixels. The main difference in practice between the two arrangements remains in the detailed different fabrication procedures, as well as the resulting different costs for the two relevant approaches, respectively.

Figure 4A:
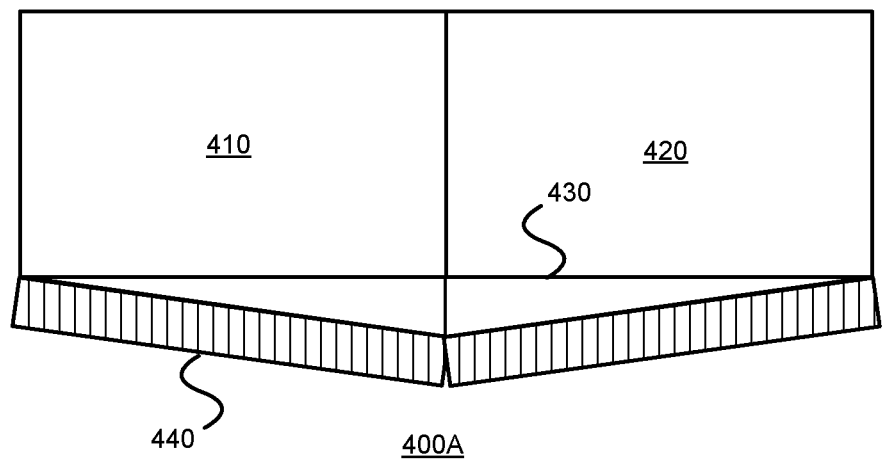
FIGS. 4A and 4B are plan views illustrating two different arrangements of example elements in systems (corresponding to the system of FIGS. 3A and 3B, respectively) for supporting an improved fidelity auto-stereoscopic 3D display to multiple simultaneous viewers.
Figure 4B:
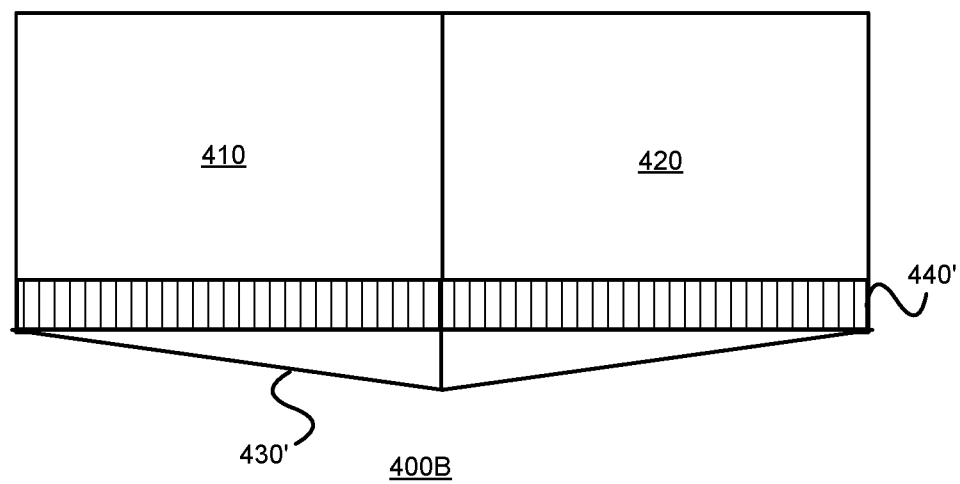

FIGS. 4A and 4B are plan views illustrating two different arrangements of example elements in systems (corresponding to the system of FIGS. 3A and 3B, respectively) for supporting an improved fidelity auto-stereoscopic 3D display to multiple simultaneous viewers. As shown in the first example system 400A of FIG. 4A, prisms 430 for left/right separation may be provided between left and right sub-pixels of a given color 410 and 420, respectively, and diffraction gratings 440 for multiplexing the image. Alternatively, as shown in an alternative example system 400B of FIG. 4B, diffraction gratings 440' for multiplexing the image may be provided between left and right sub-pixels of a given color 410 and 420, respectively, and the prisms 430' for left/right separation. Either arrangement 400A or 400B is repeated for each color of each left/right sub-pixel pair.

Note that the '540 provisional provides theory demonstrating that a diffraction grating can be provided on either side of the prism.

§ 5.1.1 Example Means for Separating the Left and Right Image Signals

Figure 5:
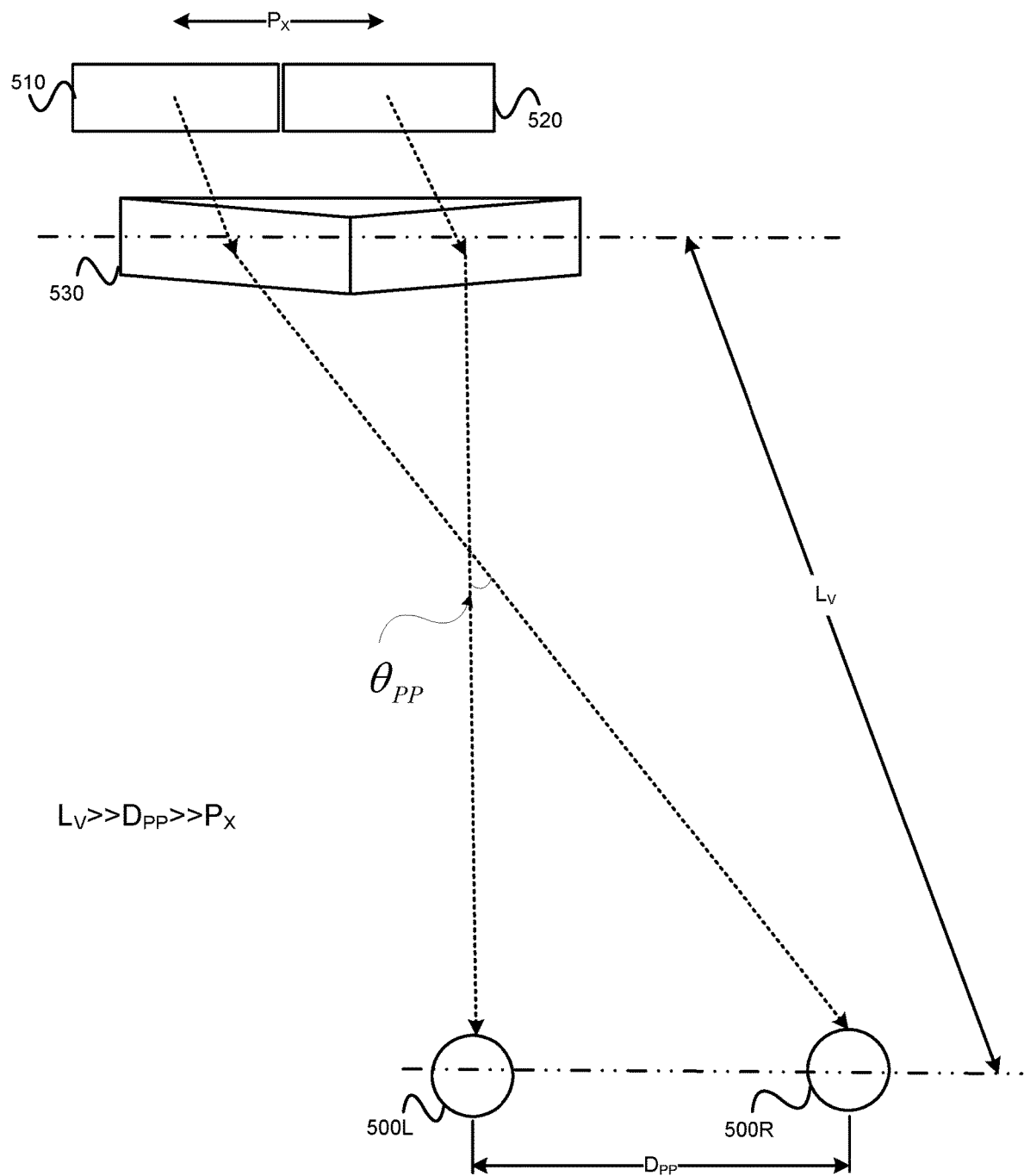
FIG. 5 illustrates how to focus a pair of left/right sub-pixels at a pair of spaced VVAs.

FIG. 5 illustrates how to focus a pair of left/right sub-pixels 510/520 at a pair of spaced VVAs 500L/500R. As shown, a prism 530 is arranged between left and right sub-pixels 510 and 520, and left and right eyes 500L and 500R of a viewer spaced a distance $L_V$ from the prism 530. The prism 530 may be a thin refraction prism (e.g., a dual-wedged refraction prism). The total required differential refraction angle ($\theta_{PP}$) in a system design can be expressed as follows:

$$\theta_{PP} = D_{PP}/L_v$$

wherein $D_{PP}$ is the distance between the left and right pupils of an average viewer's eyes. Note that if the prism material is of low dispersion, such as a Crown-type glass, or synthetic polymers (plastics) (See, e.g., the text, W. J. Smith, *Modern Optical Engineering: The Design of Optical Systems*, 2nd Ed. (1990, McGraw-Hill, Inc.), incorporated herein by reference), a single column of the thin prism 530 may be used for all Red/Green/Blue sub-pixels in both the column of left sub-pixels and the column of right sub-pixels. As will be discussed below, an alternating wedge optical element (i.e., wedged at every other pixel column) may be used instead. (See, e.g., FIGS. 9 and 11.)

Figure 6:
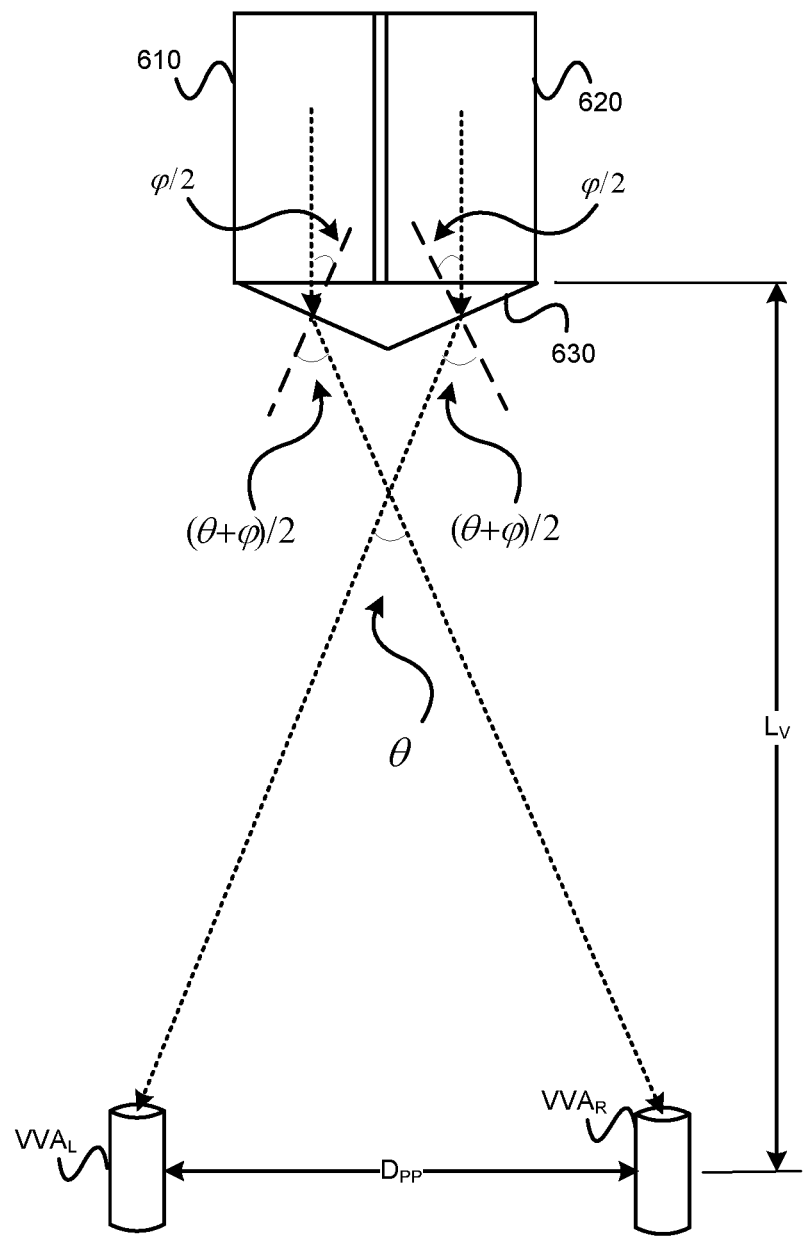
FIG. 6 illustrates dual focusing of a typical center pair of left and right sub-pixels on $VVA_L$ and $VVA_R$ corresponding to left and right pupils of a viewer.

FIG. 6 illustrates dual focusing of a typical center pair of left and right sub-pixels 610/620 on $VVA_L$ and $VVA_R$ corresponding to left and right pupils of a viewer. As shown, in a ridge type wedge prism 630, a wedge angle of $\varphi/2$ is provided for each sub-pixel of the pair 610/620, and can be defined based on the desired viewing distance $L_v$. In the following examples, it is assumed that the distance between pupils of a viewer $D_{PP}$ is 60 mm and that the horizontal distance between the centers of two sub-pixels (referred to as horizontal pixel pitch or pixel width ("$P_x$")) is much less than $D_{PP}$. For example, if $L_v$ is set to 3 m, $\varphi/2$ is 11.5°, and if $L_v$ is set to 6 m, $\varphi/2$ is 6°. In the following, assume that n is the wedge's 630 index of refraction. Applying Snell's Law of refraction:

$$n\sin(\varphi/2) = n_0 \sin\left[\frac{\theta + \varphi}{2}\right]$$

wherein $n_o = 1$, is index in the air. Therefore, at very small angles (i.e., $\varphi \ll 1$, and $\theta \ll 1$, since $\theta$ is proportional to $$\frac{D_{PP}}{L_V}),$$

we have, $\theta = \varphi(n-1)$, or restated:

$$\varphi = \frac{\theta}{n-1}$$

Therefore, for a typical optical material, if $n=1.5$, $\varphi = 2\theta$ as the design angle of the wedges.

Figure 7:
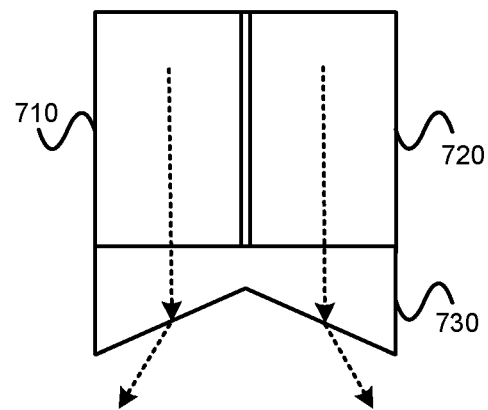
FIG. 7 illustrates an alternative means for separating left and right sub-pixel signals.
Figure 8A:
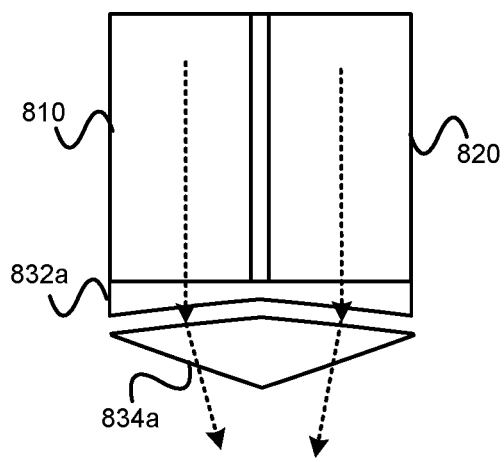
FIGS. 8A and 8B illustrate other alternative means for separating left and right pixel signals.
Figure 8B:
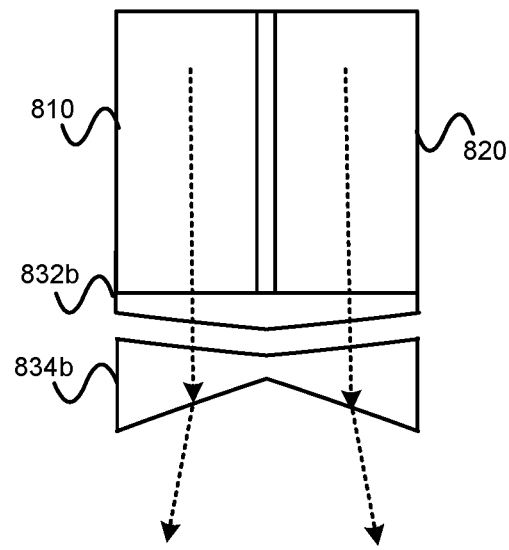

FIG. 7 illustrates an alternative means for separating left and right sub-pixel signals. More specifically, FIG. 7 includes a concave wedge prism 730 adjacent to a left sub-pixel 710 and a right sub-pixel 720. FIG. 8A illustrates yet another alternative means for separating left and right pixel signals. More specifically, FIG. 8A includes a concave wedge prism 832a made of a flint-type material in combination with a convex wedge prism 834a made of a crown-type material. The concave flint-type wedge prism 832a is provided adjacent to the left sub-pixel 810 and right sub-pixel 820. The thinner concave flint-type wedge prism 832a serves to fully compensate for (i.e., cancel), or at least drastically reduce, any index dispersion dependent on the optical wavelength for the convex crown-type wedge prism 834a, and thus results in effectively dispersion-free prisms for each of the red, green and blue wavelengths. Alternatively, as shown in FIG. 8B, a thinner convex wedge prism 832b made of a flint-type material may be used in combination with a concave wedge prism 834b made of a crown-type material.

Figures 9A, 9B:
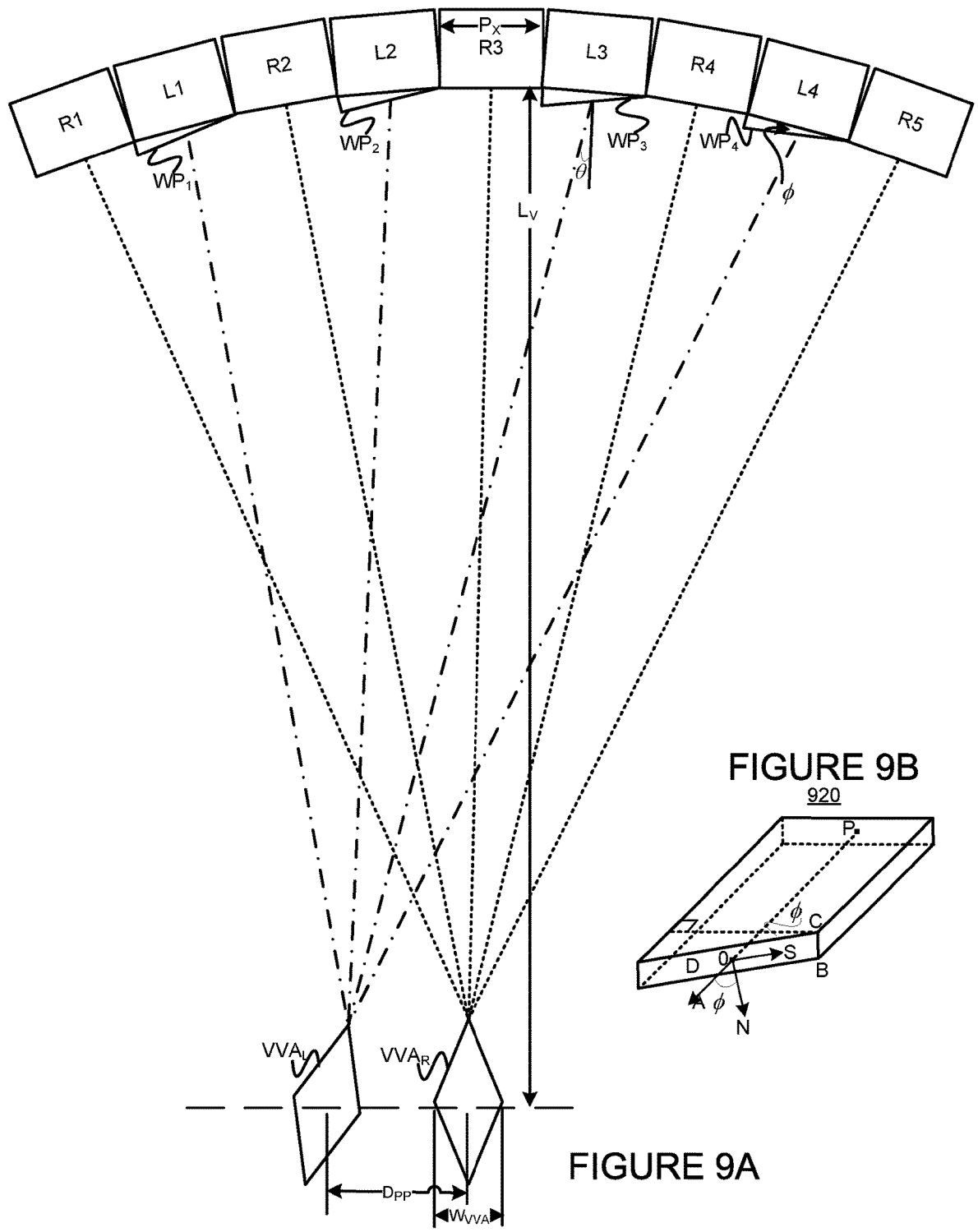
FIG. 9A is a plan view illustrating how focusing of image information from multiple left and right sub-pixels to $VVA_R$ and $VVA_L$ occurs in a portion of an example spherical, concave panel display.
FIG. 9B is a perspective view of an example sub-pixel element having a wedged face.

FIG. 9A is a plan view illustrating how focusing of image information from multiple left and right sub-pixels to $VVA_R$ and $VVA_L$ occurs in a portion of an example spherical, concave panel display. (For simplicity of the drawing, means for multiplexing the separated left and right image signals to a plurality of users are not shown.) As shown, the right sub-pixels ($R_1$-$R_5$) are focused onto $VVA_R$. This is because the output faces of the pixel light beams are on the same concave spherical surface. Consequently, all beams are focused to $VVA_R$, with effective diffraction beam size $$W_{VVA}\left(=\frac{\lambda_0 L_V}{P_x}\right).$$

On the other hand, wedges ($WP_1$-$WP_4$), provided in front of respective ones of the left sub-pixels ($L_1$-$L_4$), focus the left image signals onto $VVA_L$. Although the wedges are provided on only the left sub-pixels, in alternative embodiments, wedges may be provided on only the right sub-pixels, or on both the left and right sub-pixels. In FIG. 9A, the distance $L_V$ is designed equal to the radius of curvature of the spherical concave panel that is formed by the plurality of pixels/sub-pixels. The angle $\varphi = \theta/(n-1)$, where $\varphi$ is the design angle of the wedge, $\theta$ is an angle the light ray output from a sub-pixel makes with a line normal to the surface of the concave spherical panel, and n is the index of refraction of the wedge material.

FIG. 9B illustrates example perspective 3D view of a wedged sub-pixel 920 with bevel front surface ABCD having a wedge angle φ. Sub-pixel 920 has a central axis orientated at $\overline{PO}$. Noting that when φ=0, sub-pixel 920 is reduced to a regular non-bevel pixel. Therefore notations here will apply to both flat surfaced pixels and bevel surfaced pixels. Vector $\overline{ON}$ represents surface normal direction of front surface ABCD, and vector $\overline{OS}$ represents surface gradient direction, or referred to as maximum slope direction of pixel surface ABCD. In FIG. 9B, surface normal vector $\overline{ON}$ and surface gradient vector $\overline{OS}$ both reside in a horizontal plane. Vector $\overline{ON}$ has rotated angle φ to the right, away from vector $\overline{PO}$, while remaining in a horizontal plane.

When sub-pixel 920 is built into a flat panel (see FIGS. 21 and 22), or built into a concave cylindrical panel with axis of symmetry aligned in the vertical direction (see FIG. 23), surface normal vector $\overline{ON}$ and surface gradient vector $\overline{OS}$ will both remain in a horizontal plane. When sub-pixel 920 is built into a concave spherical panel (see FIGS. 19, 20 and 23, e.g.), or into a concave cylindrical panel with axis of symmetry aligned in the horizontal direction (see FIG. 23), both surface normal vector $\overline{ON}$ and surface gradient vector $\overline{OS}$ may depart slightly away from an ideal horizontal plane. However, since a radius of curvature of a curved panel is normally significantly larger than overall sizes (width and height) of the panel, both surface normal vector $\overline{ON}$ and surface gradient vector $\overline{OS}$ will remain aligned within a substantially horizontal plane in curved panel constructions.

Figure 10:
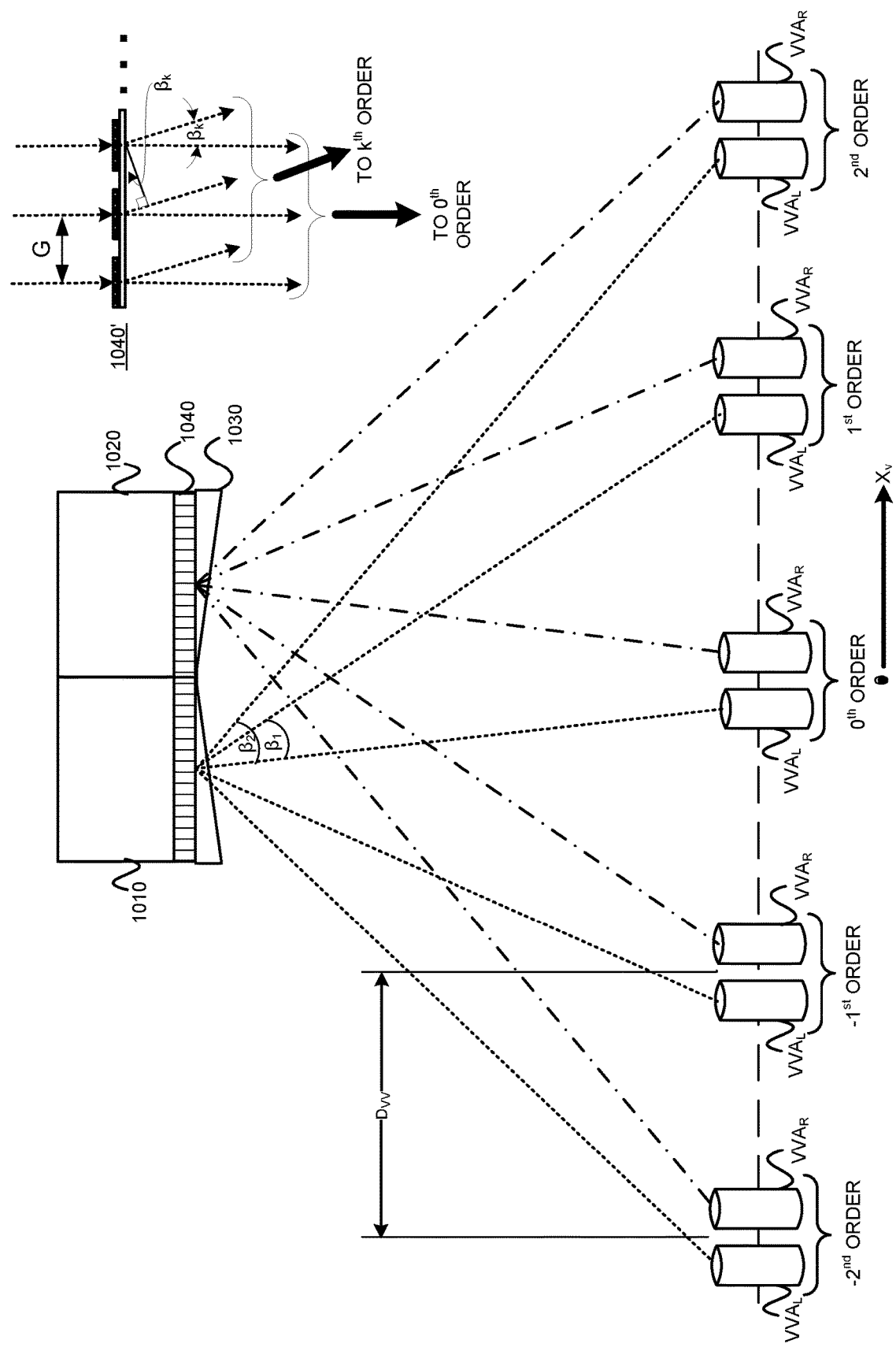
FIG. 10 is a plan view diagram illustrating multiplexing of dual focused left and right sub-pixels.

§ 5.1.2 Example Means for Multiplexing Separated Left and Right Signals to a Plurality of Users FIG. 10 is a plan view diagram illustrating multiplexing of dual focused left and right sub-pixels 1010/1020. As shown, a diffraction grating 1040 is provided between the left and right sub-pixels 1010/1020 of a center sub-pixel pair and a concave wedge prism 1030. (Recall from FIGS. 3 and 4 that the concave wedge prism 1030 could have been provided between the left and right sub-pixels 1010/1020 and the diffraction gratings 1040 instead.) Define the distance between two neighboring viewers as $D_{VV}$ and assume that $D_{VV}$ is about 20 inches, or 0.5 meters. Since the wedge angle (φ/2)<<1 (note that the unit of φ is taken in radians, and the distance between pupils of a viewer ($D_{PP}$) is much smaller than the distance from the viewers to the screen ($L_V$), since tilting angle θ is proportional to $$\left(\frac{D_{PP}}{L_V}\right).$$

Assume that the grating 1040 is on the flat face of the sub-pixel(s) 1010, 1020. As shown in FIG. 10, grating pitch (also referred to as grating period) is denoted as G. Referring to 1040' (exploded view of the local grating), in accordance with the know grating equation at the k-th diffraction order:

$$G*\sin\beta_k = n_o k \lambda_0$$

When $n_o=1$, k=1, and $\beta_1<<1$, thus, for the $1^{st}$ diffraction order:

$$G*\beta_1 = \lambda_0$$

Also:

$$\beta_1 = \frac{D_{vv}}{L_V}$$

Therefore, we have reached our design value for the design value of grating pitch as:

$$G = \lambda_o L_V / D_{vv}$$

(See, e.g., the texts J. W. Goodman, *Introduction to Fourier Optics: 3rd Ed.* (2005, Roberts & Company Publishers, Greenwood Village, Colo.), and F. T. S. Yu, *Optical Information Processing* (1983, John Wiley & Sons, Inc.), both incorporated herein by reference.) Thus, given $D_{VV}$, $\lambda_0$, and $L_V$, the grating pitch (G) can be determined.

Recall that $\lambda_{blue}$ is about 450 nm, $\lambda_{green}$ is about 520 nm, and $\lambda_{red}$ is about 620 nm, once again we assume that the typical wavelength $\lambda_0$ is about 500 nm and typical viewer-to-viewer distance $D_{VV}$ is about 0.50 m for our example analysis. Thus, for an LCD-based panel display placed at a home theater, the example relationships between the typical design values of the grating pitch G and the viewer-to-screen distance $L_V$ include:

if $L_v=3$ m, then G=3 μm;
if $L_v=5$ m, then G=5 μm;
if $L_v=10$ m, then G=10 μm.

Accordingly, for an LED illuminated larger billboard panel display, the example relationships between the typical design values of the grating pitch G and the viewer-to-screen distance $L_V$ include:

if $L_v=30$ m, then G=30 μm;
if $L_v=50$ m, then G=50 μm;
if $L_v=100$ m, then G=100 μm.

Apparently, provided with a fixed distance between any two adjacent viewers $D_{vv}$, the required design value of the grating pitch G is increasing proportionally with the increase of the viewer-to-screen distance $L_V$. Once again, other values are possible.

Figure 11:
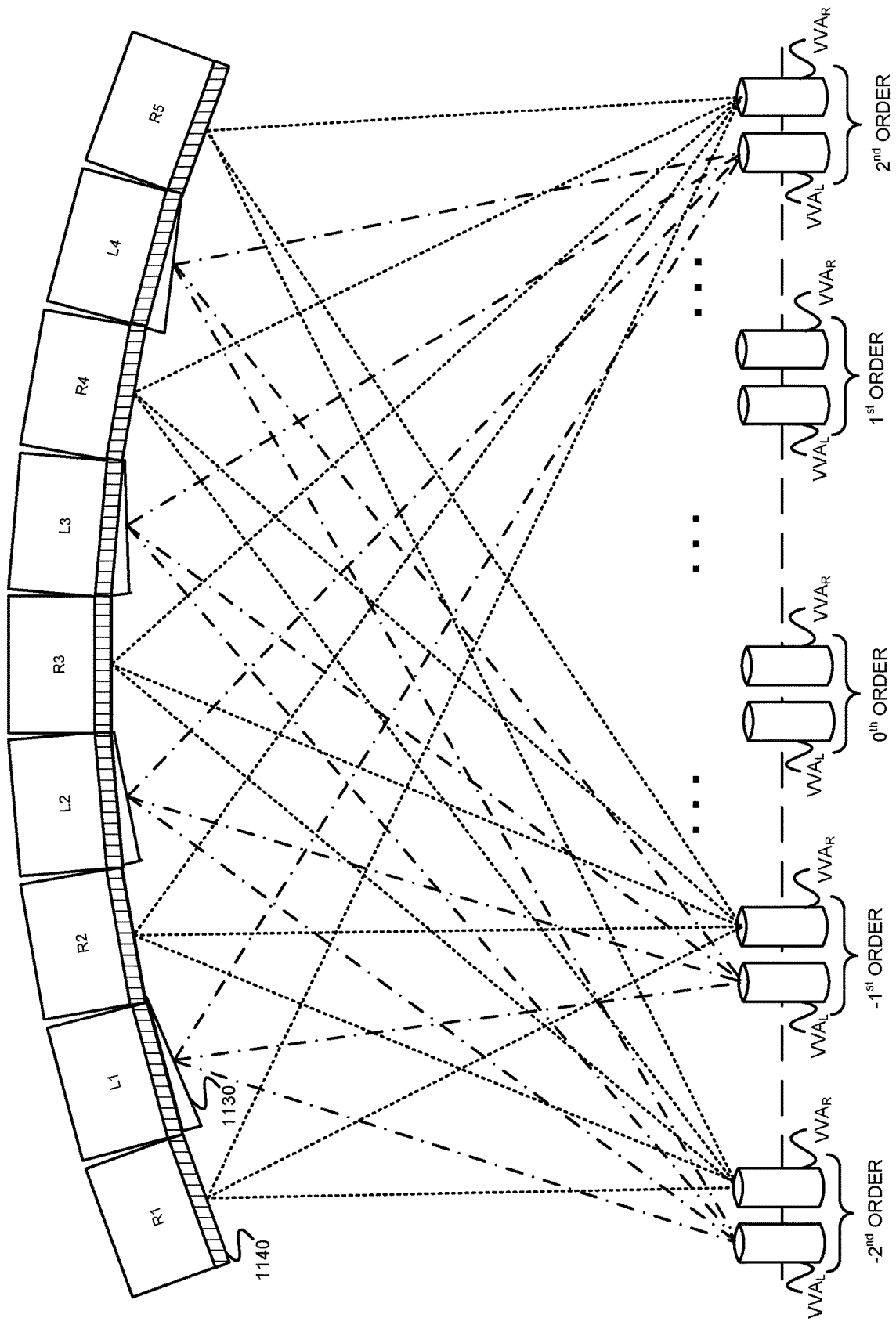
FIG. 11 is a plan view diagram illustrating an example system which provides multiplexed separated left and right signals to a plurality of viewers.

FIG. 11 is a plan view diagram illustrating an example system which provides multiplexed separated left and right signals to a plurality of viewers. More specifically, the gratings 1140 multiplex the right image signals from right sub-pixels ($R_1$-$R_5$) to $VVA_R$'s in which the viewers' right eyes may reside. The wedge prisms 1130 and gratings 1140 collectively operate to multiplex and direct the left image signals from left sub-pixels ($L_1$-$L_4$) to $VVA_L$'s in which the viewers' left eyes may reside. To reiterate, the wedge prisms 1130 could be applied to the right pixels instead. Alternatively, prisms such as those discussed above with reference to FIGS. 6-8 can be applied to both the left and right pixels.

§ 5.1.2.1 Example Gratings

FIG. 12A illustrates a pixel 1215 provided with a diffraction grating 1240. In some example embodiments consistent with the present invention, the optical element(s) for multiplexing image signals to multiple eyes of multiple viewers may be a diffraction grating(s). Example amplitude-type diffraction gratings that may be used in example embodiments consistent with the present invention are described in § 5.1.2.1.1 below. The relationship between duty cycle of the amplitude-type grating and maximum number of simultaneous viewers accommodated is discussed in § 5.1.2.1.2. Then, in § 5.1.2.1.3., a method is provided for adjusting a grating's pitch based on the lighting color of a particular sub-pixel (for amplitude-type and phase-type gratings). Further, example phase-type diffraction gratings that may be used in example embodiments consistent with the present invention are described in § 5.1.2.1.4 below. Then, taking a sinusoidal profiled phase-type grating as example, detailed phase modulation mechanism of phase-gratings onto a typical uniformly distributed wave-front is analyzed. A method for increasing maximum number of simultaneous viewers entertained is also presented, by means of adjusting peak-to-peak thickness ($H_{pp}$) of phase gratings.

FIGS. 12D and 12E illustrate example grating configurations at front surfaces of sub-pixels 1250 and 1260, including, e.g., amplitude-type and phase-type gratings. In FIGS. 12D and 12E, both sub-pixels 1250 and 1260 are shown with a wedged front surface having a bevel angle φ, Noting that when φ=0, sub-pixel 1250 and 1260 are reduced to regular flat surfaced pixels, thus representations here shall apply to both flat surfaced pixels and bevel surfaced pixels.

In FIG. 12D, one-dimensional line-gratings 1255 are incorporated onto front surface ABCD, wherein grating lines are straight, parallel, and equally spaced. A space between two adjacent grating lines are referred to as grating pitch or grating period G (not shown). Tangential vector $\overline{OL}$ is pointing upward, defined within grating surface ABCD and along a direction of grating lines. In FIG. 12D, grating lines 1255 are orientated in the vertical direction. When sub-pixel 1250 is built into a flat surfaced panel (see FIGS. 21 and 22, e.g.), or into a concave cylindrical panel having axis of symmetry aligned in the vertical direction (see FIG. 23), grating lines 1255 will remain aligned in the vertical orientation. When sub-pixel 1250 is built into a concave spherical panel (see FIGS. 19, 20 and 23, e.g.), or into a concave cylindrical panel having axis of symmetry aligned in the horizontal direction (see FIG. 23), grating lines 1255 may depart slightly away from the ideal vertical direction. Nevertheless, since a radius of curvature of a curved panel is normally significantly larger than overall sizes (width and height) of the panel, grating lines 1255 will remain aligned in a substantially vertical direction in curved panel constructions.

In FIG. 12E, two-dimensional cross gratings 1265 are incorporated onto front surface ABCD. Two set of grating lines are built into orthogonally crossed gratings 1265, having first set of grating lines aligned in the vertical direction and second set of grating lines aligned in the horizontal direction. Each of two sets grating lines are straight, parallel, and equally spaced. Tangential vector $\overline{OL_1}$ is pointing upward, defined within grating surface ABCD and along a direction of first set grating lines. Tangential vector $\overline{OL_2}$ is pointing right, defined within grating surface ABCD and along a direction of second set grating lines. For the vertically aligned grating lines (first set), a space between two adjacent grating lines are referred to as a first grating pitch $G_1$ (not shown, in horizontal dimension). Likewise, for the horizontally oriented grating lines (second set), a space between two adjacent grating lines are referred to as a second grating pitch $G_2$ (not shown, in vertical dimension). When sub-pixel 1260 is built into a flat surfaced panel (see FIGS. 21 and 22, e.g.), or into a concave cylindrical panel having axis of symmetry aligned in the vertical direction (see FIG. 23), the first set grating lines of cross gratings 1265 will remain aligned in the vertical direction, and the second set grating lines of cross gratings 1265 will remain aligned in the horizontal direction. When sub-pixel 1260 is built into a spherical concave panel (see FIGS. 19, 20 and 23, e.g.), or into a concave cylindrical panel having axis of symmetry aligned in the horizontal direction (see FIG. 23), the first set grating lines may depart slightly away from the ideal vertical direction and second set grating lines depart slightly away from the ideal horizontal direction. However, since a radius of curvature of a curved panel is normally significantly larger than overall sizes (width and height) of the panel, the first set grating lines will remain aligned in a substantially vertical direction, the second set grating lines will remain aligned in a substantially horizontal direction in curved panel constructions.

As shown in FIGS. 10 and 11, 1D line gratings having grating lines aligned in a vertical direction can be used to multiplex one pair of $VVA_L/VVA_R$ to a 1D array of VVA pairs along a row in horizontal dimension. Accordingly, the benefit via applying 2D orthogonal crossed gratings is to multiplex one pair of $VVA_L/VVA_R$ to a 2D array of VVA pairs along horizontal and vertical dimensions at the viewer's space. This makes it possible for multiple rows of viewers to visualize a 3D panel display simultaneously, having each next row of viewers sitting at a pre-designed level of height that is higher than the beforehand row.

§ 5.1.2.1.1 Amplitude-Type Gratings

FIG. 12B illustrates an amplitude-type diffraction grating including light blocking portions $1240_b$, and transparent portions $1240_t$.

FIG. 12C illustrates an amplitude-grating having a duty cycle, corresponding to FIG. 12B, of about 25%. A relationship between the duty cycle of the grating and the number of simultaneous viewers to be supported is described in § 5.1.2.1.2 below, with reference to FIGS. 13A-16C. Other amplitude-type gratings are possible.

Figure 13A:
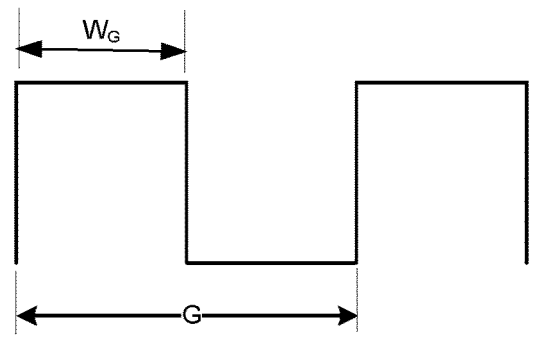
FIGS. 13A-13C, 14A-14C and 15A-15C illustrate how the duty cycle of the amplitude-type grating can be changed to support different numbers of viewers.
Figure 13B:
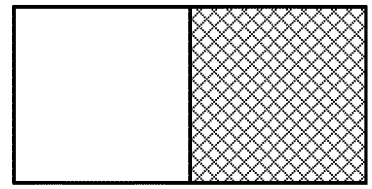
Figure 13C:
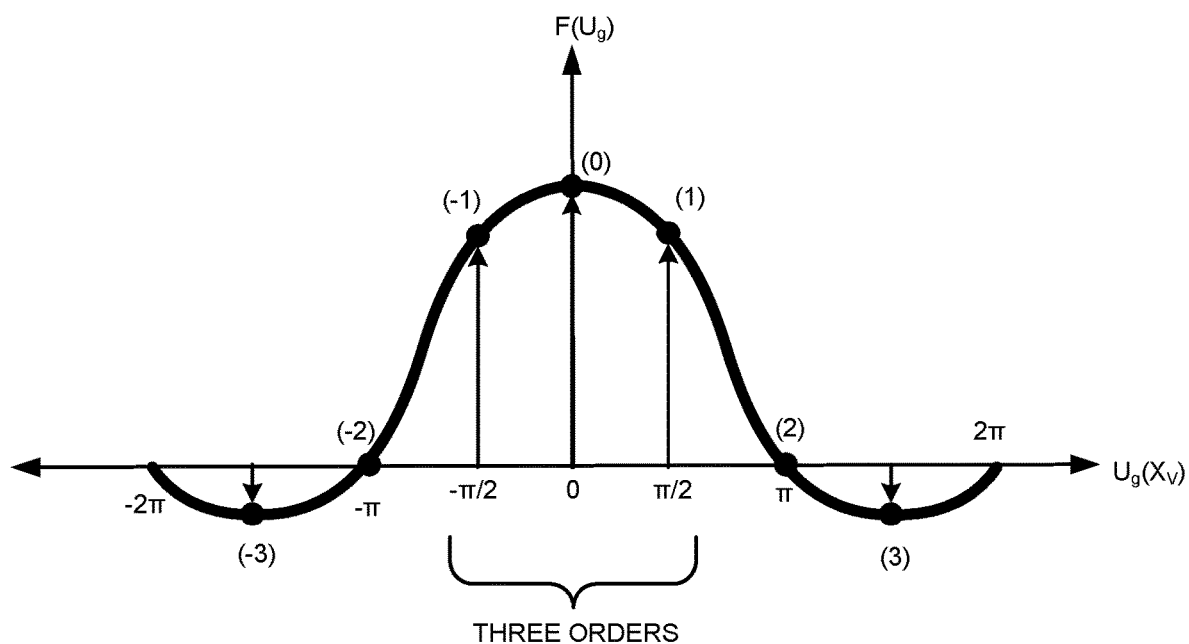

§ 5.1.2.1.2 Adjusting a Grating Duty Cycle Based on a Maximum Number of Simultaneous Viewers to be Supported In this section, the use of duty cycle in an amplitude-type diffraction grating to define a maximum number of simultaneous viewers is described. FIG. 13A illustrates a rectangular waveform having a duty cycle of 1:2 (or 50%). The grating period is $G=2W_G$, and $W_G$ is the width of the pass band within each grating period G. As shown in FIG. 13B, the right part of the grating section blocks light, while the left part of the grating section is transparent to light. (Note that in most example embodiments consistent with the present invention, this pattern is repeated multiple times for each pixel or sub-pixel.) FIG. 13C illustrates the diffraction spectrum of the rectangular waveform of the 50% duty cycle diffraction grating. As shown, the chosen duty cycle (50%) of the diffraction grating supports up to three (3) simultaneous viewers, at the $-1^{st}$, $0^{th}$, and $1^{st}$ orders. In this example, at the $1^{st}$ order of diffraction, $$D_{vv} = \frac{\lambda L_V}{G}$$

wherein $L_V$ is the viewers' distance from screen, and λ is the wavelength of the light signal, and $D_{vv}$ is the lateral space from the $0^{th}$ order viewer to the $1^{st}$ order viewer. The angle of diffraction at the $1^{st}$ order ($\beta_1$) is $$\beta_1 = \frac{\lambda}{G} = \frac{D_{vv}}{L_V}$$

Where $\beta_1$ is in unit of radians and $\beta_1 \ll 1$. Further defining a new scaled up angular parameter ($U_g$) as $$U_g = \frac{\pi G}{2\lambda L_V} * x_v$$

Then at the $\pm 1^{st}$ diffraction orders, $$U_g = \pm \frac{\pi}{2}.$$

Note that the same definition above for $U_g$ can be further applied to other types of gratings, including other amplitude-type grating in FIGS. 14 and 15, and a variety of phase-type gratings shown in FIGS. 17A-E.

If the waveform of FIG. 13A is $f(\xi)$, the Fourier expansion of $f(\xi)$ is:

$$f(\xi) = \frac{1}{2}\left[1 + \frac{4}{\pi}\left(\cos\frac{2\pi\xi}{G} - \frac{1}{3}\cos\frac{6\pi\xi}{G} + \frac{1}{5}\cos\frac{10\pi\xi}{G} - \ldots\right)\right] = \frac{1}{2}\sum_i A_i \exp\left(\frac{j2\pi\xi}{G}\right)$$

Where i=0, ±1, ±3, ±5, . . . ; and $\xi$ is the grating plan coordinate that is perpendicular to the lines of the grating. Noting the lines of the grating are parallel, periodical and all running in the vertical direction, $\xi$ is a coordinate laying in the horizontal direction. Therefore:

$$f(\xi) = NTT * \left[1 + \frac{2}{\pi}\exp\left(\frac{j2\pi\xi}{G}\right) + \frac{2}{\pi}\exp\left(\frac{-j2\pi\xi}{G}\right) + HOT\right]$$

wherein j is the imaginary unit for a complex value that satisfies the equation $j^2=-1$; and NTT is defined as the Nominal Total Transmission (throughput) and for this example waveform in FIG. 13A, NTT=½; $A_0=1$ (normalized DC amplitude) for the 0th order;

$$A_1 = A_{-1} = \frac{2}{\pi} = 0.637$$

for the $-1^{st}$ and $1^{st}$ orders. For diffraction viewing, within $$|U_g| \leq \frac{\pi}{2},$$

there are only three viewing points; namely, $0^{th}$ order, at which Amplitude=1, and $\pm 1^{st}$ order, at which Amplitude=2/$\pi$=0.637. The relative power spectrum of the orders is as follows: $P_0=1$; and $P_{\pm 1}=4/\pi^2=0.405$. Apparently, at the maximum viewing angles (e.g., in this example, at +1 and −1 orders), $$U_g = \pm \frac{\pi}{2}.$$

Figure 14A:
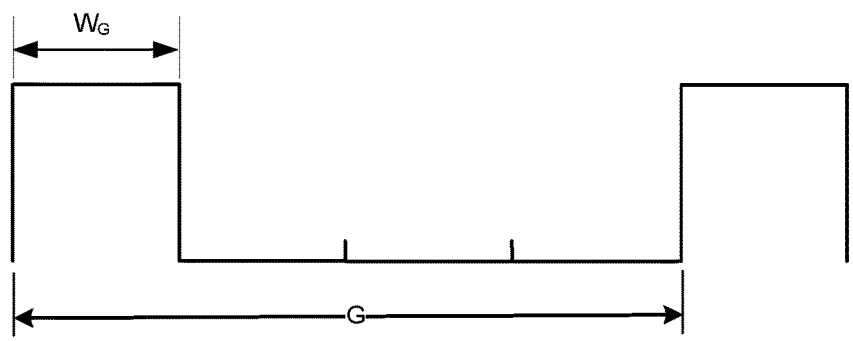
Figure 14B:
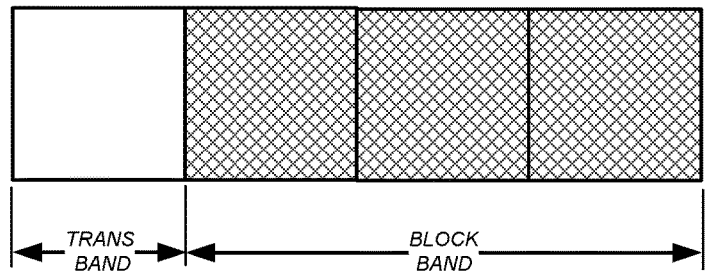
Figure 14C:
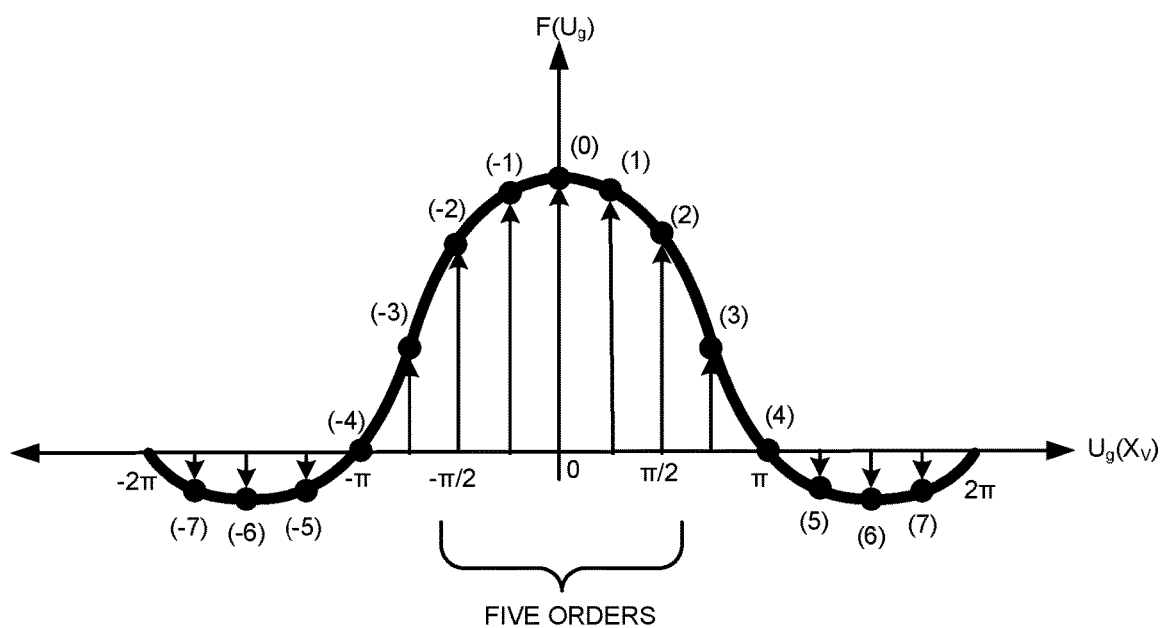

FIG. 14A illustrates a rectangular waveform having a duty cycle of 1:4 (or 25%). The grating period G=4$W_G$. As shown in FIG. 14B, the left-most part of the grating section is transparent to light, while the remainder of the grating section blocks light. (Note that in most example embodiments consistent with the present invention, this pattern is repeated multiple times for each pixel or sub-pixel.) FIG. 14C illustrates the diffraction spectrum of the rectangular waveform of the 25% duty cycle diffraction grating. As shown, the chosen duty cycle (25%) of the diffraction grating supports up to five (5) simultaneous viewers, at the $-2^{nd}$, $-1^{st}$, $0^{th}$, $1^{st}$ and $2^{nd}$ orders. In this example, $A_0=1$ (normalized DC amplitude), $0^{th}$ order;

$$A_1 = A_{-1} = \frac{2\sqrt{2}}{\pi} = 0.900;$$

and $A_2=A_{-2}=2/\pi=0.637$. For diffraction viewing, $$|U_g| \leq \frac{\pi}{2},$$

there are now five viewing points; namely, $0^{th}$ order, at which Amplitude=1; $\pm 1^{st}$ order, at which $$\text{Amplitude} = \frac{2\sqrt{2}}{\pi} = 0.900;$$

and $\pm 2^{nd}$ order, at which Amplitude=2/$\pi$=0.637. The relative power spectrum of the orders is as follows: $P_0=1$; $P_{\pm 1}=8/\pi^2=0.803$; and $P_{\pm 2}=0.405$. Apparently, at the maximum viewing angles (e.g., in this example, at +2 and −2 diffraction orders), $U_g$ reaches the same maximum value as the $\pm 1^{st}$ orders in the example of FIG. 13C, namely, $$\pm \frac{\pi}{2}.$$

Figure 15A:
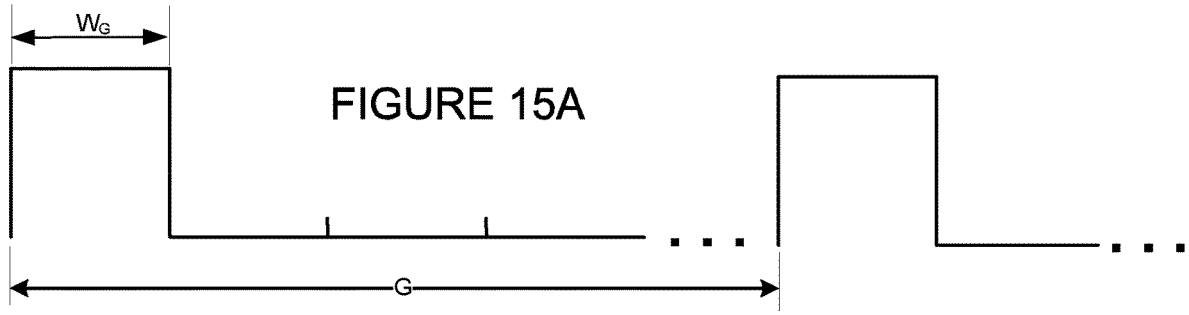
Figure 15B:
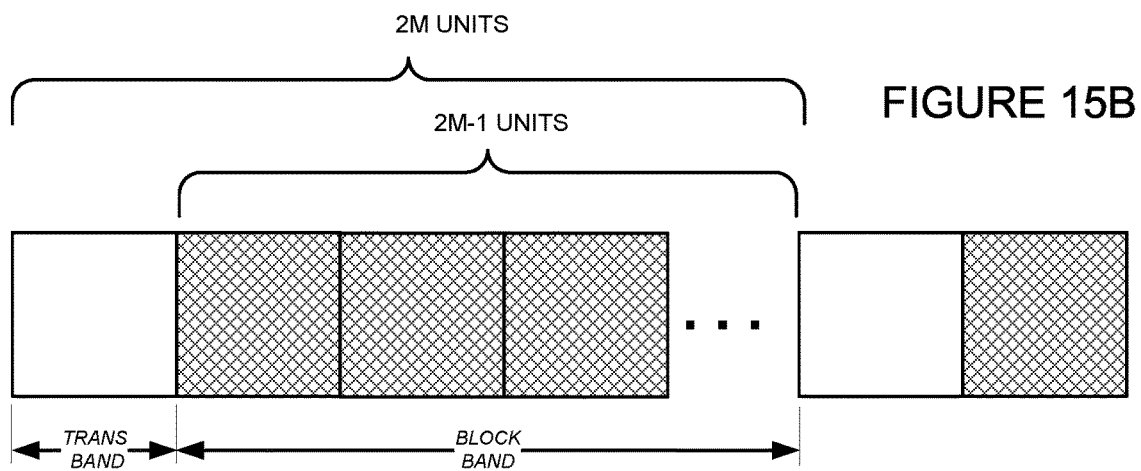
Figure 15C:
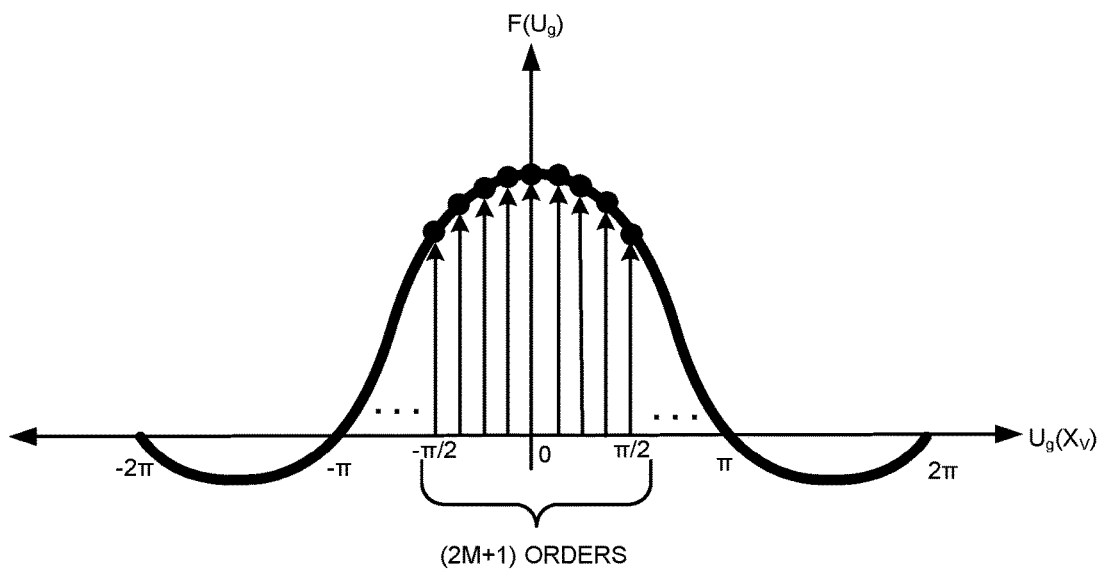

FIGS. 15A-15C illustrate a general case rectangular waveform having a duty cycle of 1:2M, where M is a positive integer. The grating period G=2M*$W_G$. As shown in FIG. 15B, the left part of the grating section (section width $W_G$) is transparent to light, while the remainder of the grating section blocks light. (Note that in most example embodiments consistent with the present invention, this pattern is repeated multiple times for each pixel or sub-pixel.) FIG. 15C illustrates the diffraction spectrum of the rectangular waveform of the 1/(2M) % duty cycle diffraction grating. As shown, there are 2M+1 diffraction orders with sufficient amplitudes for simultaneously entertaining up to 2M+1 viewers. The relative diffraction amplitudes, on an envelope, are $$\frac{\sin(U_g)}{(U_g)}, \text{ where } |U_g| \leq \frac{\pi}{2}.$$

The relative diffraction power values, on an envelope, are $$\frac{\sin^2(U_g)}{(U_g)^2}, \text{ where } |U_g| \le \frac{\pi}{2}.$$

As should be appreciated from the foregoing examples, as M increases, the efficiency decreases. Indeed, the Nominal Total Transmission (throughput) is reduced to NTT=1/(2M). Also, the Amplitude and Power envelopes are not uniform, and HOT vanishes gradually.

§ 5.1.2.1.3 Matching a Grating Pitch Based on Color

Figure 16C:
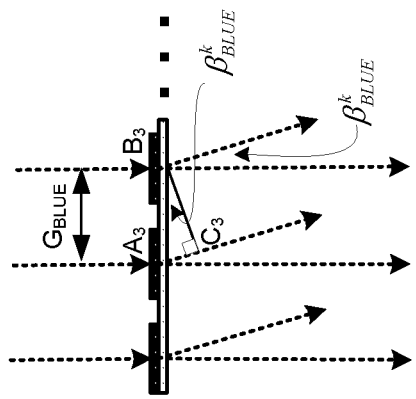
FIGS. 16A-16C illustrate a relationship of grating pitches ($G_{RED}$, $G_{GREEN}$, $G_{BLUE}$) for red, green, and blue sub-pixels, respectively.
Figure 16B:
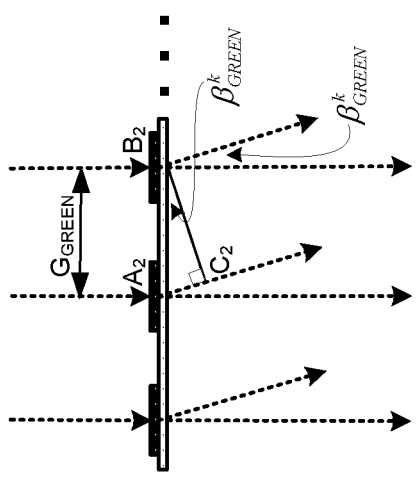
Figure 16A:
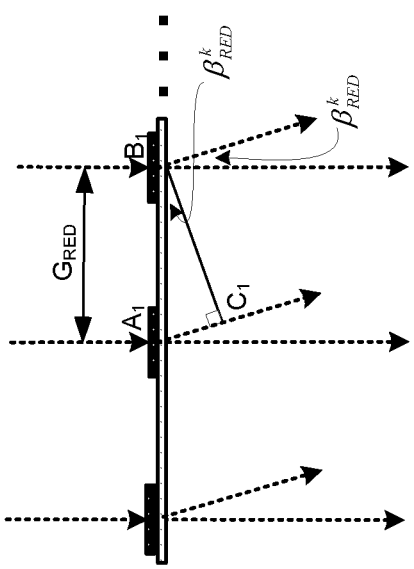

FIGS. 16A-16C illustrate a relationship of grating pitches ($G_{RED}$, $G_{GREEN}$, $G_{BLUE}$) for red, green, and blue sub-pixels, respectively. More specifically, for the same $k^{th}$ diffraction order, the diffraction angles ($\beta$) should be the same for all red, green and blue sub-pixels. That is, $\beta_{RED}{}^k = \beta_{GREEN}{}^k = \beta_{BLUE}{}^k$, where k is an integer. To make the diffraction angles equal, the gratings have different pitches for each color due to the colors' different wavelengths. More specifically, as shown in FIG. 16A, the grating pitch $G_{RED}$ for red pixels can be expressed as:

$$G_{RED}*\sin(\beta_{RED}{}^k) = k\lambda_{RED}$$

As shown in FIG. 16B, the grating pitch $G_{GREEN}$ for green pixels can be expressed as:

$$G_{GREEN}*\sin(\beta_{GREEN}{}^k) = k\lambda_{GREEN}$$

Finally, as shown in FIG. 16C, the grating pitch $G_{BLUE}$ for blue pixels can be expressed as:

$$G_{BLUE}*\sin(\beta_{BLUE}{}^K) = k\lambda_{BLUE}$$

Note that in all three color cases, the quantities at both sides of the equations are referred to as the optical path differences ("OPD") on the $k^{th}$ diffraction orders, from one pitch grating dispersion corresponding to the line segments $\overline{A_1C_1}$, $\overline{A_2C_2}$, $\overline{A_3C_3}$, as shown in FIGS. 16A-16C, respectively, i.e., $$OPD_{RED} = G_{RED}*\sin(\beta_{RED}{}^k),$$

$$OPD_{GREEN} = G_{GREEN}*\sin(\beta_{GREEN}{}^k),$$

$$OPD_{BLUE} = G_{BLUE}*\sin(\beta_{BLUE}{}^K).$$

The mutual relations between the three colored OPD's are:

$$OPD_{RED}/OPD_{GREEN}/OPD_{BLUE} = \lambda_{RED}/\lambda_{GREEN}/\lambda_{BLUE}$$

wherein symbol "/" denotes the traditional divide sign, or alternatively, it can be read as "ratio." Finally, since $\beta_{RED}{}^k = \beta_{GREEN}{}^k = \beta_{BLUE}{}^k$, the governing equations between the three colored grating pitches are:

$$G_{RED}/G_{GREEN}/G_{BLUE} = \lambda_{RED}/\lambda_{GREEN}/\lambda_{BLUE},$$

wherein symbol "/" bears the same meaning as in the relationships above.

§ 5.1.2.1.4 Phase-Type Gratings

Figure 17A:
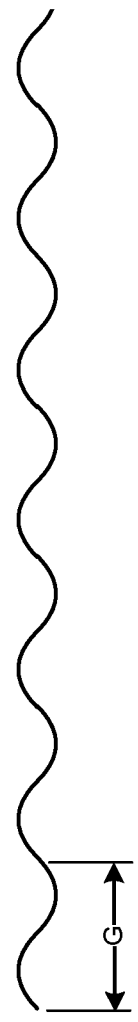
FIGS. 17A-17E illustrate different phase-type gratings.
Figure 17B:
Figure 17C:
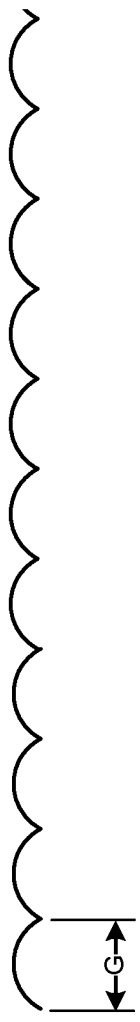
Figure 17D:
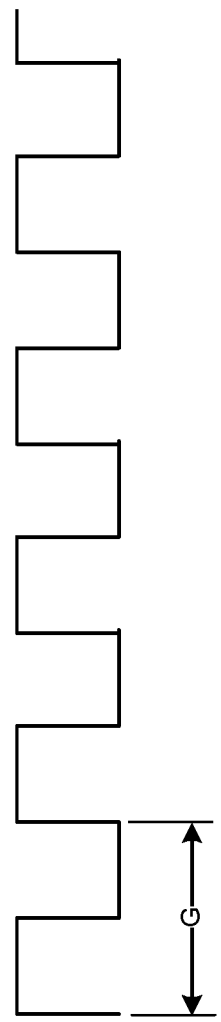
Figure 17E:
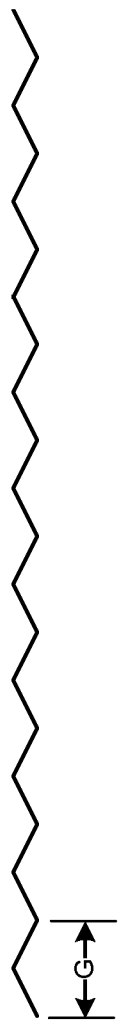

FIGS. 17A-17E illustrate different phase-type gratings. More specifically, FIG. 17A illustrates a sinusoidal phase-type grating of pitch G (also referred to as grating period G), FIG. 17B illustrates a cylindrical (concave) phase-type grating of pitch G, FIG. 17C illustrates a cylindrical (convex) phase-type grating of pitch G, FIG. 17D illustrates a square phase-type grating of pitch G, and FIG. 17E illustrates a saw-tooth phase-type grating of pitch G. Other phase-type gratings are possible.

Figure 18:
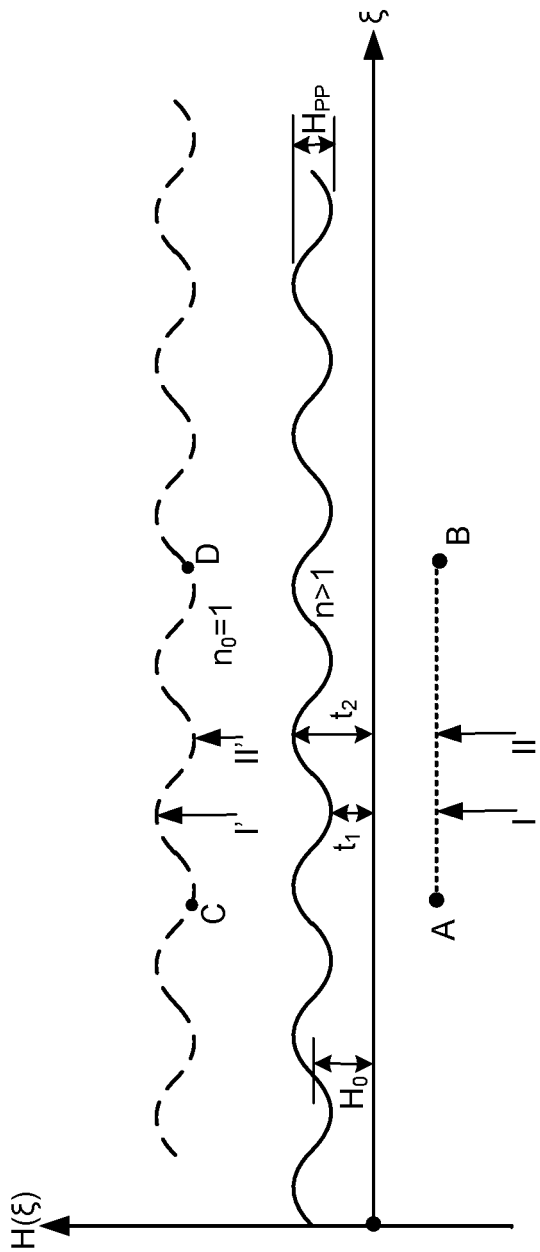
FIG. 18 illustrates the relationship between phase gratings and light transmission.

FIG. 18 illustrates the effect on a plane waterfront, by a phase-type grating having a sinusoidal profile distribution along an axis ($\xi$) that is perpendicular to the direction of the grating lines. (Recall, e.g., FIG. 17A.) In FIG. 18, the profile of the grating height h($\xi$) may be expressed as:

$$h(\xi) = H_0 + \frac{H_{pp}}{2} \cdot \sin\left(\frac{2\pi\xi}{G}\right)$$

where $H_{pp}$ is defined as the grating's peak-to-peak height, and $h_{(\xi)}$ is defined as the grating height profile along $\xi$-axis.

In FIG. 18, I and II are two "beam pencils" of a collimated beam impinging onto the grating from its bottom side, the line segment $\overline{AB}$ represents a plane optical wavefront of the collimated input beam, I' and II' are two beam pencils emerging out from other side of the grating, and $t_1$ and $t_2$ are the grating's thicknesses at two points along $\xi$-axis. The initial phase difference ($\Delta\varphi_{21}$) between two input beam pencils I and II onto the grating can be expressed as:

$$\Delta\varphi_{21} = \varphi_2 - \varphi_1 = 0$$

The new phase difference ($\Delta\varphi'_{21}$) between two output beam pencils I' and II' from the grating can be expressed as:

$$\Delta\varphi'_{21} = \varphi'_2 - \varphi'_1 = -\frac{2\pi}{\lambda}(n-1)(t_2 - t_1)$$

Wherein the forefront negative ("−") sign indicates that the beam pencil that traveled through a thicker part of the grating ($t_2$) is retardated at the output side, relative to the beam pencil that traveled across a thinner part of the grating ($t_1$).

In FIG. 18, curved profile $\overline{CD}$ indicates a curved wavefront after emerging out from the grating. Note that curve $\overline{CD}$ has a similar sinusoidal shape with the same period G as the grating, but its phase is supplementary (180° differ) with respect to the grating profile.

Assuming at $\xi=0$, the beam output has phase $\varphi_0$, then output beam pencil I' has phase, $$\varphi_1(\xi) = \varphi_0 - \frac{\pi}{\lambda}(n-1) \cdot H_{pp} \cdot \sin\left(\frac{2\pi\xi}{G}\right)$$

where G & $H_{pp}$ are two parameters of the phase grating, and n is refraction index of the grating medium within thickness h($\xi$). Parameter G is the grating pitch, also referred to as grating period, and adjustment of G allows one to control the viewer-to-viewer distance $D_{VV}$ in FIG. 10.

Parameter $H_{pp}$ is phase grating's peak-to-peak height (or referred to as peak-to-peak thickness), and adjustment of $H_{pp}$ allows one to control relative power distributions to all diffraction orders. In general, by increasing $H_{pp}$ value, one can redistribute the total transmitted power from a panel display into more and more high-order diffraction terms (HOT's); Therefore, by means of adjusting peak-to-peak thickness of a phase grating ($H_{pp}$), it offers the capability for controlling the maximum number of viewers that can be simultaneously accommodated by a 3D panel display system.

Phase-type gratings have another major advantage as compared with amplitude-type gratings, e.g., as shown in FIGS. 12A-C. In amplitude-type gratings, light-blocking bands are present, e.g. 1240b in FIG. 12B, and thus NTT of a 3D panel display system based on amplitude-type diffraction gratings are normally substantially less than unity. Refer to discussions of NTT values for amplitude-type gratings in previous sections (§ 5.1.2.1.1-2.1.2). In phase-type gratings, however, light-blocking bands are non-existing. Accordingly, nominal total transmission (NTT) of a phase-type grating can be made virtually as high as 100% (minor power losses at both surfaces of the gratings are ignored). Therefore, the total optical power efficiency (or referred to as throughput) of a 3D panel display system can be made to a high level that is nearly perfect.

§ 5.1.3 Focusing Panels

Figure 19B:
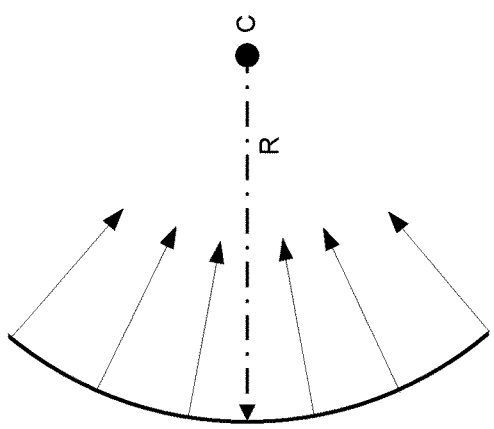
FIGS. 19A and 19B illustrate an example spherical concave focusing panel.
Figure 19A:
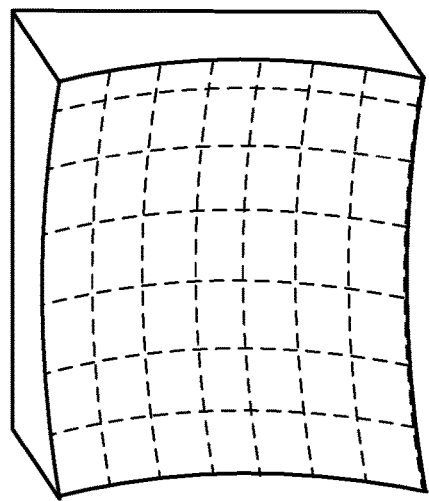

In this section, various alternative example focusing panel embodiments are described. FIG. 19A is a simplified front perspective view of a spherical concave focusing panel. As shown in FIG. 19B, a cross-section of the spherical concave focusing panel may define an arc of a circle of radius R, centered at point C. Naturally, light beams emerging from an array of pixels that are mounted on the concave spherical panel can be focused onto a single point C, or be focused at the vicinity of point C when presence of optical aberrations and diffraction effects are considered. The vicinity region surrounding point C in space constitutes a VVA as described previously (e.g., FIG. 9).

Figure 20C:
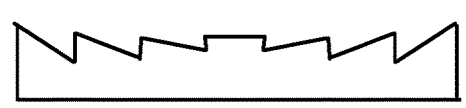
FIGS. 20A-20C illustrate a concave, piece-wise, spherical focusing panel including an array of flat subpanels, each having a plurality of pixels.
Figure 20B:
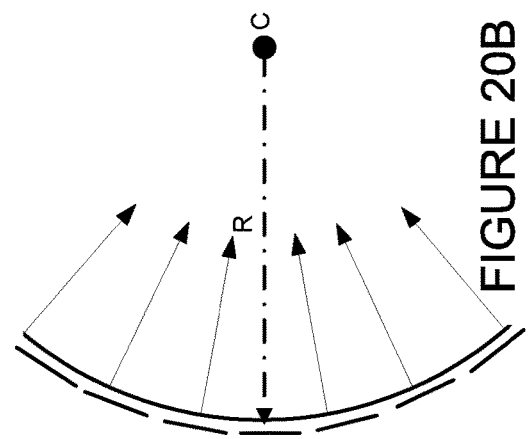
Figure 20A:
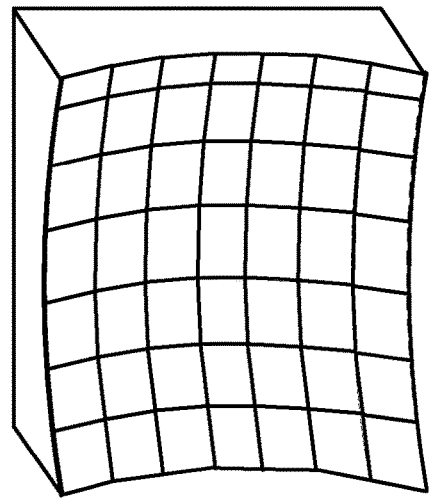

FIG. 20A is a simplified front perspective view of a concave, piece-wise flattened, spherical focusing panel including an array of flattened smaller subpanels, each having a plurality of pixels. As shown in FIGS. 20B and 20C, a cross-section of the concave, piece-wise flattened, spherical focusing panel may include the subpanels arranged on a flat base or a curved base. To simplify manufacturing, and/or to reduce total thickness of the entire screen panel (and consequently, reducing the weight of the screen panel) as compared with the subpanels shown on FIGS. 20A and 20B, the subpanels may be arranged as shown in FIG. 20C. During manufacturing, size of the piece-wise flattened subpanels are made significantly smaller than the size of the whole display panel, so that any extra focusing aberrations resulting from the piece-wise flattened subpanels are negligible to the viewers and the system performs in a similar manner as shown in FIGS. 19A and 19B.

Figure 21A:
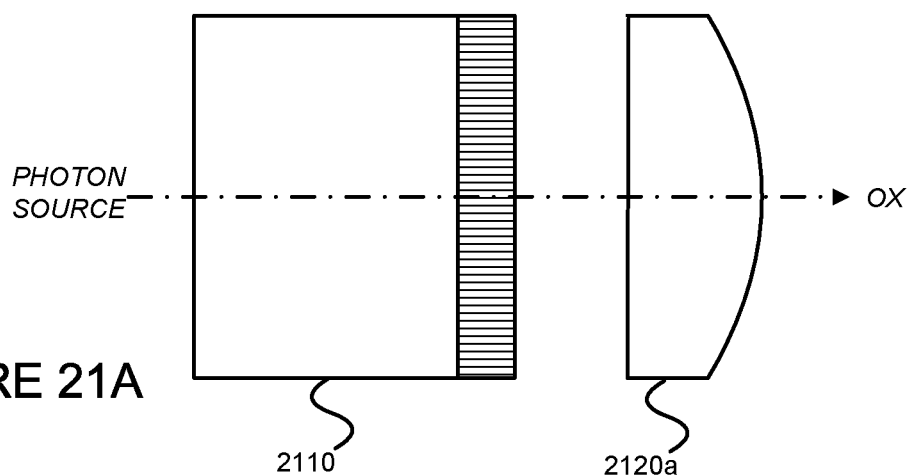
FIGS. 21A-21C illustrate a flat display panel incorporating front-side focusing means via a convex singlet lens, an achromatic duplex lens, or an achromatic triplex lens.
Figure 21B:
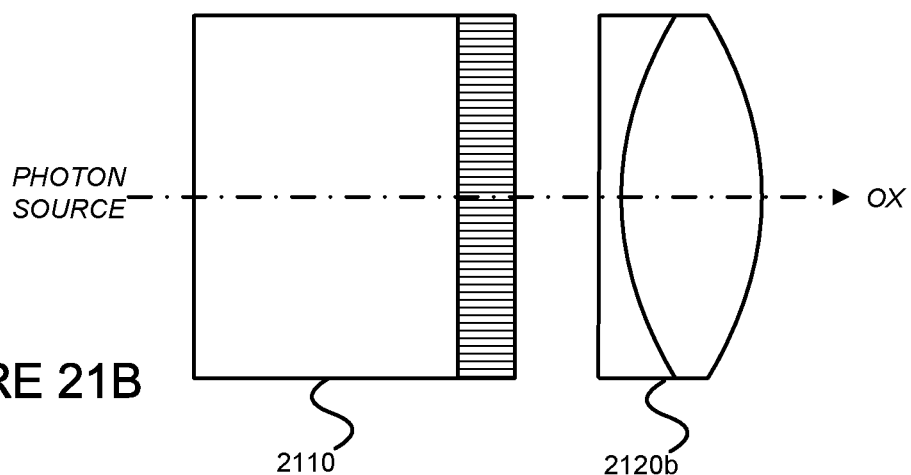
Figure 21C:
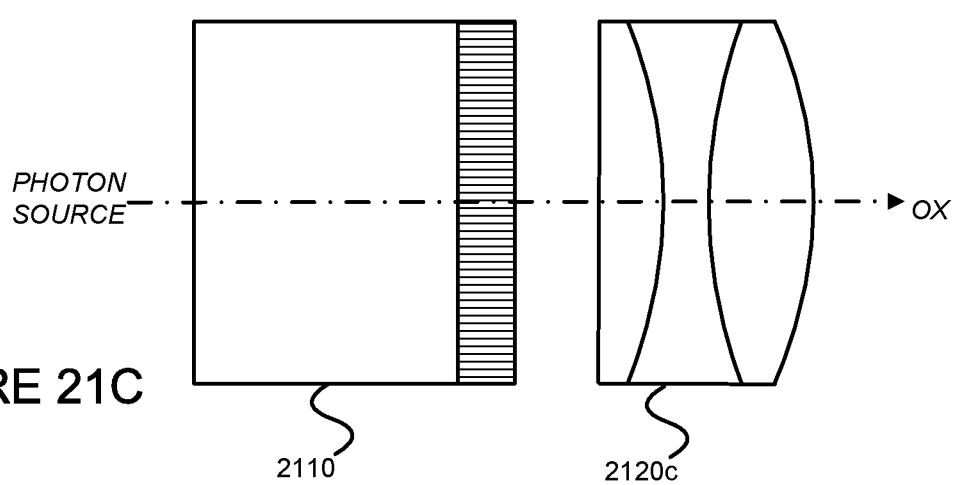

FIG. 21A is a cross section view illustrating a flat panel display 2110 having a convex singlet lens 2120a (e.g., crown type, low dispersion) between the flat panel display 2110 and the viewer(s) (not shown). FIG. 21B is a cross section view illustrating a flat panel display 2110 having a convex achromatic doublet lens 2120b (e.g., with Flint and Crown curvatures; concave and convex) between the flat panel display 2110 and the viewer(s) (not shown). FIG. 21C is a cross section view illustrating a flat panel display 2110 having a convex achromatic triplet lens 2120c (e.g., Crown-Flint-Crown; convex, concave, convex) between the flat panel display 2110 and the viewer(s) (not shown). By the use of the focusing power of a lens (i.e., 2120a, 2120b or 2120c), light beams emerging from an array of pixels that are mounted on the flat display panel (2110) can be focused onto a single point at a viewer's space (not shown, which is a point located at far-field from the display panel). More precisely, when presence of optical aberrations and diffraction effects are considered, these light beams emerging from an array of pixels of the flat panel are focused at the vicinity of a single point (not shown), and this vicinity region in space constitutes a VVA as we described previously (e.g., FIG. 9A). In FIGS. 21B and 21C, achromatic duplex lens 2120b and achromatic triplex lens 2120c operate similarly as singlet lens 2120a, but provide better compensations of the chromatic dispersions than singlet lens 2120a.

Figure 22C:
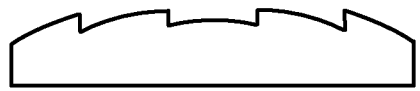
FIGS. 22A-22C illustrate a flat display panel incorporating front-side focusing means via a convex Fresnel field lens.
Figure 22B:
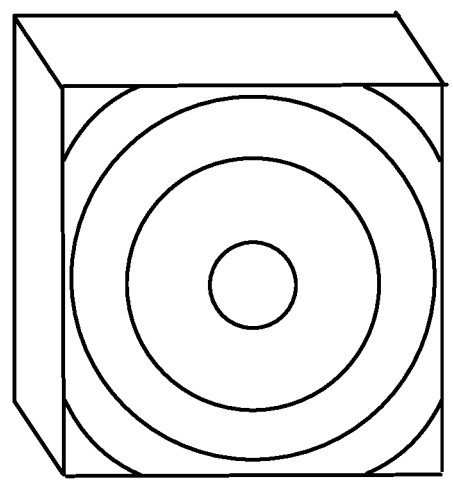
Figure 22E:
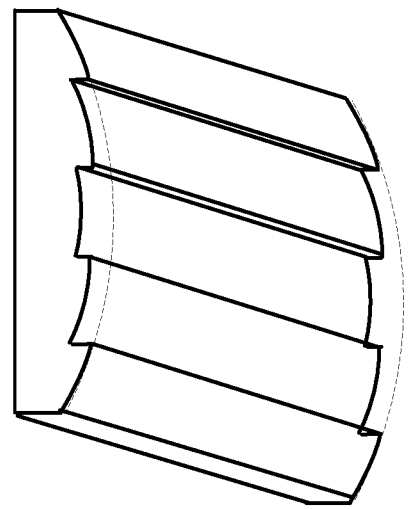
Figure 22D:
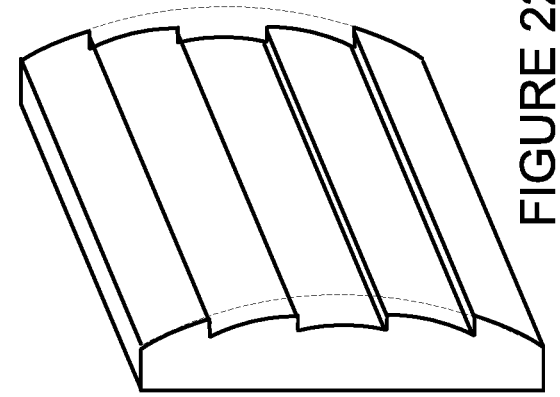
Figure 22A:
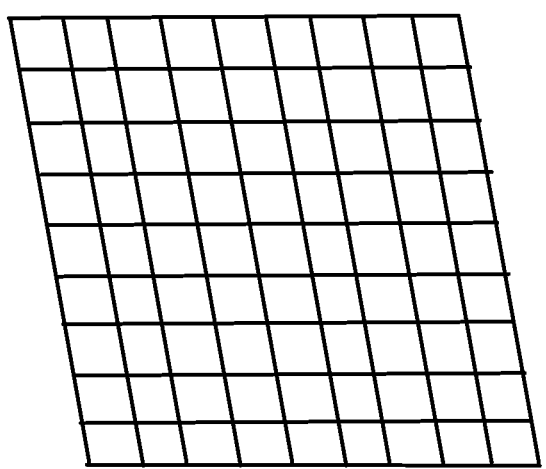

FIGS. 22A-22C illustrate an example focusing panel system for providing an auto-stereoscopic 3D display via a focused panel and VVA multiplexing. More specifically, FIG. 22A illustrates a flat panel including a plurality of pixels. FIG. 22B is a perspective view illustrating a 2D Fresnel optical component having circular grooves, and FIG. 22C is a side cross-sectional view of the 2D Fresnel optical component. In application, 2D Fresnel lens of FIGS. 22B and 22C performs similar focusing function for a flat panel display as the convex lenses shown in FIGS. 21A-21C.

FIGS. 22A, 22D and 22E demonstrate other examples focusing panel system for providing an auto-stereoscopic 3D display via a focused panel and VVA multiplexing. More specifically, FIG. 22A illustrates a flat panel including a plurality of pixels. FIG. 22D is a perspective view illustrating a 1D cylindrical lens having its axis of cylindrical symmetry aligned in a horizontal dimension (shown by dotted profile), or a 1D Fresnel-style lenticular optical component having its straight grooves aligned in a horizontal dimension (shown by solid profile); and FIG. 22E is a perspective view of a 1D cylindrical lens having its axis of cylindrical symmetry aligned in a vertical dimension (shown by dotted profile), or a 1D Fresnel-style lenticular optical component having its straight grooves aligned in a vertical dimension (shown by solid profile). In one example application, both 1D cylindrical lenses of FIGS. 22D and 22E are utilized in tandem with each other. In another example application, both 1D Fresnel lenticular optical components of FIGS. 22D and 22E are utilized in tandem with each other. During operations, both tandem assemblies of two orthogonal-oriented 1D cylindrical lenses and two orthogonal-oriented 1D lenticulars provide similar focusing function for a flat panel display, for instance, as the 2D Fresnel lens of FIGS. 22B and 22C.

FIG. 23 illustrates yet further focusing panel example systems (2300a, 2300b, 2300c and 2300d) for providing an auto-stereoscopic 3D display via a focused panel and VVA multiplexing. As shown, a system 2300a includes a concave cylindrical panel 2310 with its axis of cylindrical symmetry (2315) aligned in the vertical direction (shown in a front projection view) and a 1D cylindrical lens (2320, shown in dotted profile) having its axis of cylindrical symmetry 2325 aligned in the horizontal direction. Alternatively, a system 2300b includes a concave cylindrical panel 2310 with its axis of cylindrical symmetry (2315) aligned in the vertical direction (shown in a front projection view) and a 1D Fresnel-style lenticular optical component (2330, shown in solid profiles) having its straight line grooves 2335 aligned in the horizontal direction.

During operation, light beams emerging from a plurality of pixels of concave cylindrical panel 2310 and passing through an orthogonally-oriented 1D cylindrical lens (or a 1D Fresnel-style lenticular optical component) are brought into focus at a single point at a far field (not shown), or focused at the vicinity of a single point when presence of optical aberrations and diffraction effects are considered. This vicinity region surrounding a single focus point at a far field resembles a VVA in space as described previously (e.g., FIG. 9).

Alternatively, but not shown in FIG. 23, another system 2300c can be constructed using a concave cylindrical panel 2310 having its axis of cylindrical symmetry aligned in the horizontal direction, and a 1D cylindrical lens 2320 having its axis of cylindrical symmetry aligned in the vertical direction. Further alternatively, but not shown in FIG. 23, yet another system 2300d can be constructed using a concave cylindrical panel 2310 having its axis of cylindrical symmetry aligned in the horizontal direction, and a 1D Fresnel-style lenticular optical component having its straight grooves aligned in the vertical direction. Principle of operation of these alternative systems 2300c and 2300d are same as in systems 2300a and 2300b.

§ 5.1.4 Alternative Sub-Pixels

Figure 24B:
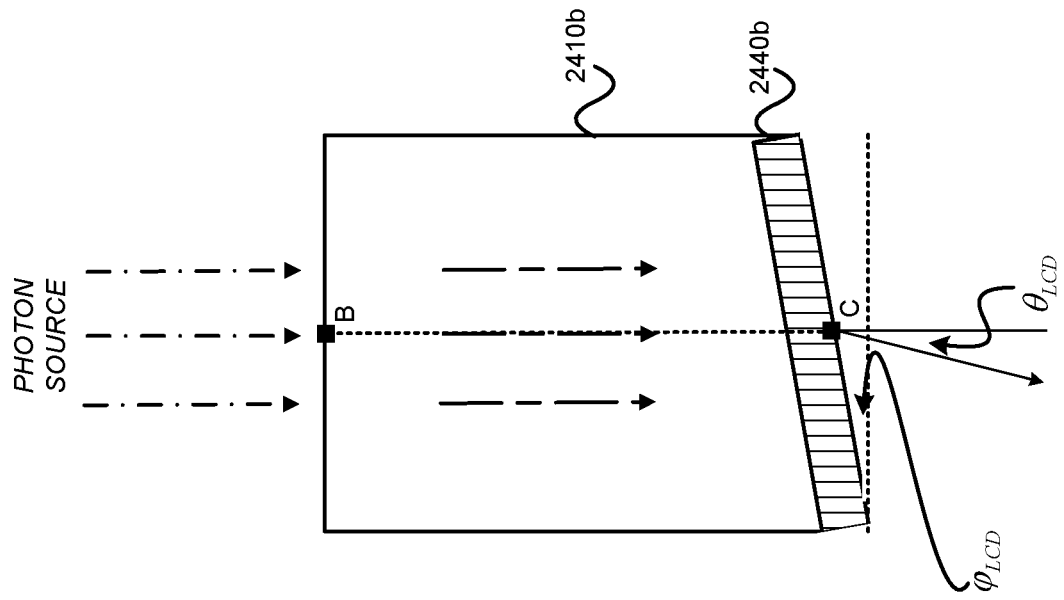
FIGS. 24A-24B and 25A-25C illustrate two different example ways to provide a basic single-color sub-pixel of an example display panel consistent with the present invention.
Figure 24A:
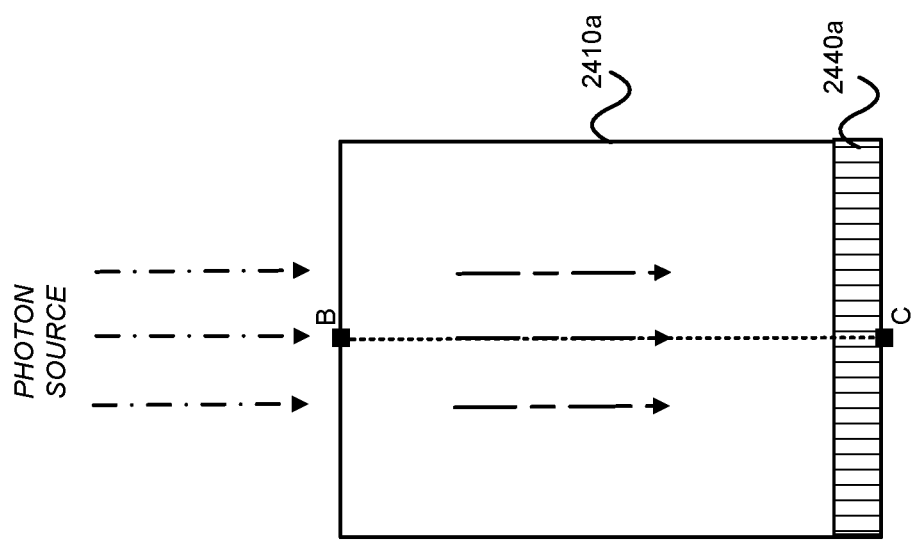

FIGS. 24A-24B and 25A-25C illustrate two different example ways to provide a basic single-color sub-pixel of an example panel display consistent with the present invention. First, as shown in FIGS. 24A and 24B, each sub-pixel may be an LCD (liquid crystal device) valve 2410a and 2410b, respectively, and the panel is back-illuminated by photon source(s), such as light emitting diodes (LEDs, not shown), or laser diodes (LDs, not shown). In this case, each pixel (or sub-pixel) is not itself generating light, but is modulating the light provided from another source(s), not shown. This is commonly referred to as "LED back-illuminated LCD panel" or "LD back-illuminated LCD panel". In FIG. 24A, the incoming light beams exit the LCD pixel straight along central axis $\overline{BC}$ of LCD pixel 2410a. In FIG. 24B, however, the LCD element 2410b is provided with a bevel. Similar to the wedge discussed above with reference to FIG. 9, the angular relationship is as follows, $$\theta_{LCD} = (n-1)\varphi_{LCD}$$

where $\varphi_{LCD}$ is an angle of the bevel, $\theta_{LCD}$ is an angle the output light ray makes with the central axis $\overline{BC}$ of LCD pixel 2410b, and n is the index of refraction of the LCD pixel medium. For example, $\varphi_{LCD}$ may be 0 for sub-pixel R1, and $\varphi$ for sub-pixel L1. Referring back to FIGS. 6 and 7, $\varphi_{LCD}$ may be $\varphi/2$ for pixel 620 or 710, and $-\varphi/2$ for pixel 610 or 720.

Figures 26A, 26B, 26C:
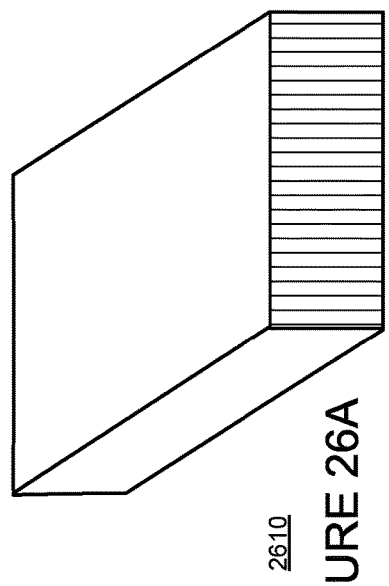

Referring to FIG. 26A, each LCD sub-pixel may be provided with a grating on its front surface. Noting that sub-pixel 2610 is shown having a flat surface, construction presentations here will apply to both flat surfaced sub-pixels and bevel surfaced sub-pixels. More specifically, FIG. 26A is a perspective view of a single color LCD sub-pixel element with a rectangular cross-sectional area. Referring to FIG. 26B, many LCD cells can be arranged together in vertical arrays 2620. Referring to FIG. 26C, many LCD cells can be arranged together in horizontal arrays 2630. More specifically, FIGS. 26B and 26C each illustrate a single pixel formed from six (6) LCD sub-pixels (each of red, green and blue for each of left and right).

Figure 25C:
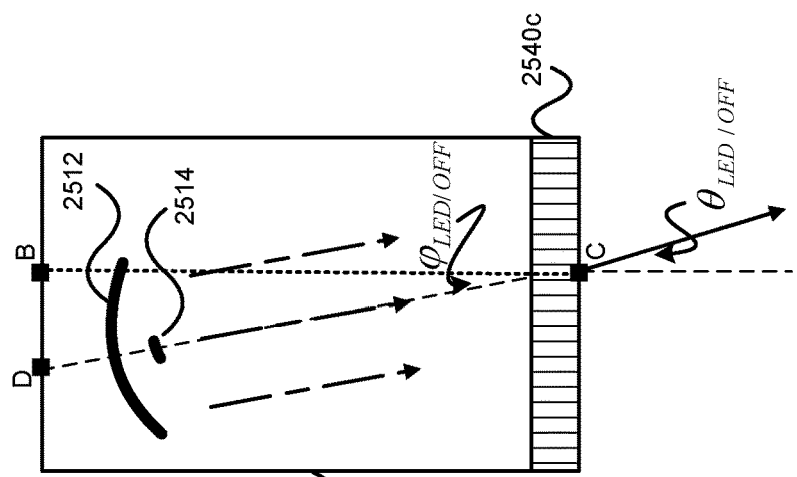
Figure 25B:
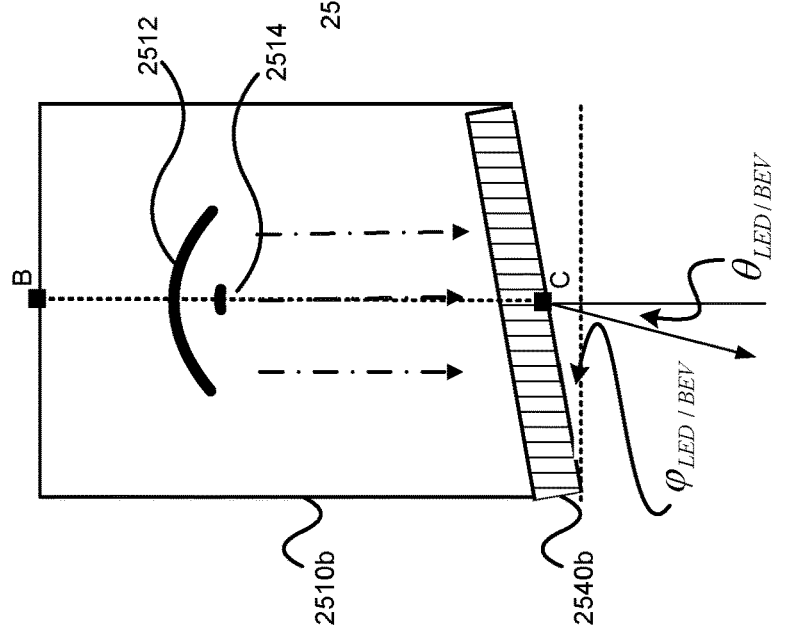
Figure 25A:
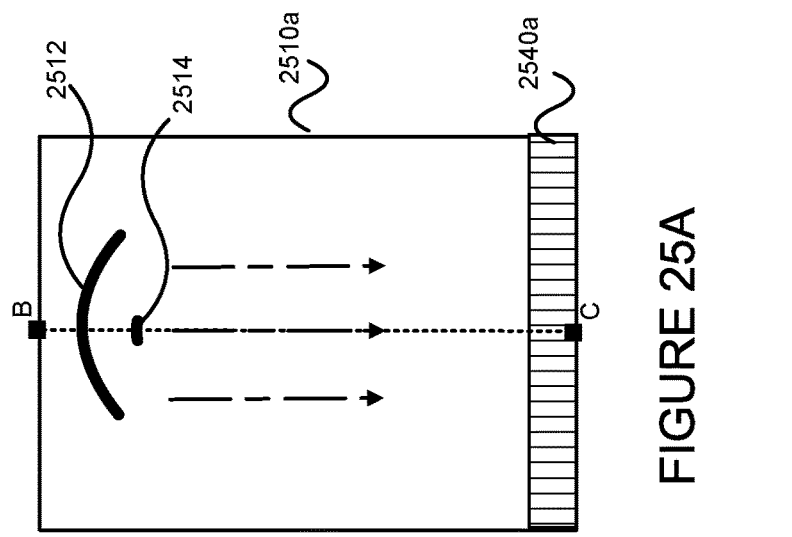

Second, as shown in FIGS. 25A-25C, each pixel (sub-pixel) may be provided as an individual device LED, and each LED both creates light and independently modulates its own light output. Each LED's input signal is directly electrical current. The LED may include an optical cavity reflector 2512 (e.g., coupled with a cathode, not shown) and a semi-conductor diode 2514 (e.g., coupled with an anode, not shown). In FIG. 25A, straight light beams are output straight along central axis $\overline{BC}$ of LED pixel 2510a. In FIG. 25B, a bevel at the front face of the LED 2510b causes the light beams to refract. Similar to the wedge discussed above with reference to FIG. 9, the angular relationship is $$\theta_{LED/BEV} = (n-1)\varphi_{LED/BEV}$$

where $\varphi_{LED/BEV}$ is an angle of the bevel, $\theta_{LED/BEV}$ is an angle the output light ray makes with respect to the central axis $\overline{BC}$ of LED pixel 2510b, and n is the index of refraction of the LED pixel medium (2510b). In FIG. 25C, the reflector 2512 and semi-conductor diode 2514 are tilted off-axis to generate light beams off-axis of the LED pixel body 2510c. Here the angular relationship is $$\theta_{LED/OFF} = n\varphi_{LED/OFF}$$

wherein $\varphi_{LED/OFF}$ is an angle the off-axis tilted LED light beam makes with respect to the central axis BC of the LED pixel body 2510c, $\theta_{LED/OFF}$ is an angle the output light ray makes with respect to the central axis $\overline{BC}$ of LED pixel 2510c, and n is the index of refraction of the LED pixel medium (2510c). Both angles $\theta_{LED/OFF}$ and $\varphi_{LED/OFF}$ are contained within a horizontal plane.

Figure 27B:
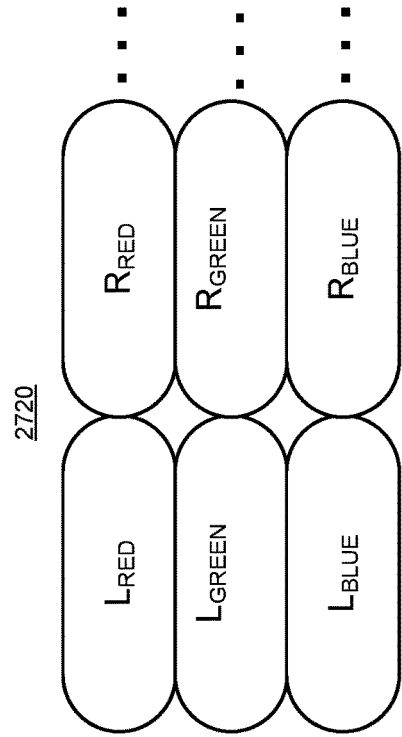
Figure 27A:
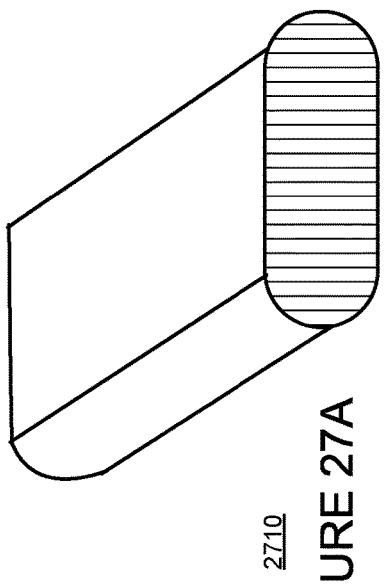
Figure 27C:
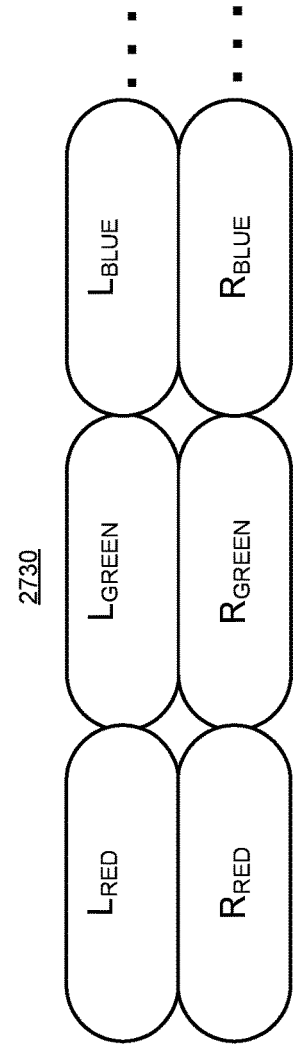
Figure 29A:
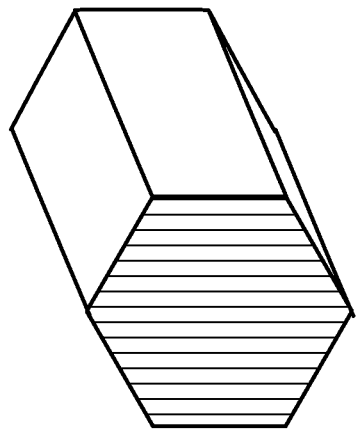
Figure 29B:
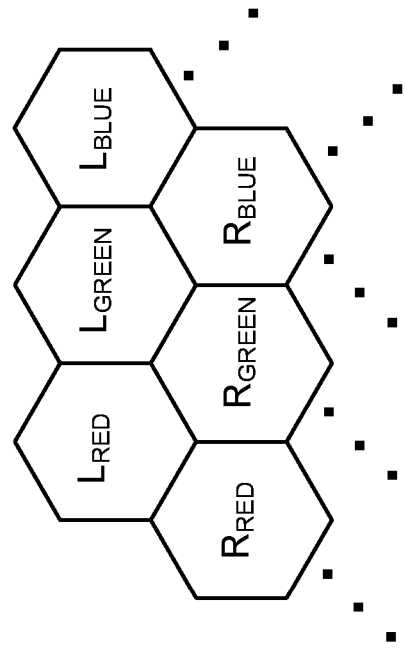
Figure 28A:
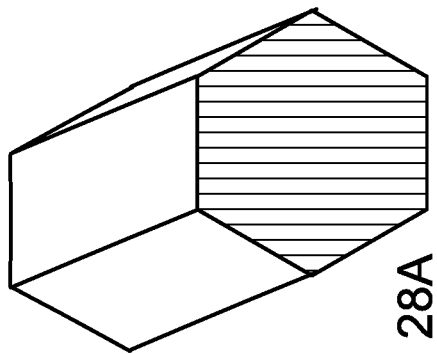
Figure 28B:
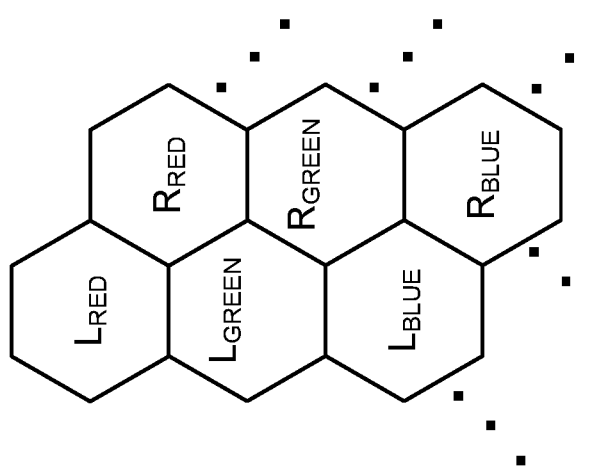

Referring to FIGS. 26A, 27A, 28A and 29A, each LED sub-pixel 2610, 2710, 2810 and 2910, respectively, may be an individual device LED. Each LED may be provided with a grating on its front surface as shown. Albeit only flat surfaced LED sub-pixels (2610, 2710, 2810 and 2910) are shown, construction presentations here apply to both flat surfaced pixels and bevel surfaced pixels. More specifically, FIG. 26A is a perspective view of a single color LED sub-pixel element with a rectangular cross-sectional area., FIG. 27A is a perspective view of a single color racetrack-shaped LED sub-pixel element, FIG. 28A is a perspective view of a single color hexagonal faced LED sub-pixel element in which the grating is perpendicular to the top and bottom edges, and FIG. 29A is a perspective view of a single color hexagonal faced LED sub-pixel element in which the grating is parallel to the right and left edges. Referring to FIGS. 26B, 27B and 28B, many LEDs can be arranged together (e.g., held by gluing and curing together using adhesives, such as epoxies) in vertical arrays 2620, 2720 and 2820, respectively. Referring to FIGS. 26C, 27C and 29B, many LEDs can be arranged together in horizontal arrays 2630, 2730 and 2930, respectively. More specifically, FIGS. 26B, 26C, 27B, 27C, 28B and 29B each illustrate a single pixel formed from six (6) LED sub-pixels (each of red, green and blue for each of left and right). Although not shown in the Figures, D-shaped sub-pixels may be used. Such D-shaped sub-pixels might also make it easier to align the grating lines of the sub-pixels.

§ 5.2 Example Methods for Auto-Stereoscopic 3D Panel Display to Multiple Simultaneous Viewers FIG. 30 illustrates an example method 3000 for supporting an auto-stereoscopic 3D panel display to multiple simultaneous viewers (or view points, also referred to as "hypothetical users"). As shown, for each of a plurality of left and right sub-pixels, the example method 3000 separates the left and right image signals (Block 3010), and multiplexes the separated left and right signals to a plurality of users (Block 3020) such that the left image is provided to a plurality of virtual volume apertures ($VVA_L$) corresponding to the left eyes of the plurality of users, and the right image is provided to a plurality of virtual volume apertures ($VVA_R$) corresponding to the right eyes of the plurality of users. This example method 3000 may be performed using a system such as that 300A illustrated in FIG. 3A.

FIG. 31 illustrates another example method 3100 for supporting an auto-stereoscopic 3D panel display to multiple simultaneous viewers (or view points, also referred to as "hypothetical users"). As shown, for each of a plurality of left and right sub-pixels, the example method 3100 multiplexes the image (Block 3110) and then separates the left and right image signals (Block 3120). As a result, the left image is provided to a plurality of virtual volume apertures (VVA$_L$) corresponding to the left eyes of the plurality of users, and the right image is provided to a plurality of virtual volume apertures (VVA$_R$) corresponding to the right eyes of the plurality of users. This example method 3100 may be performed using a system such as that 300B illustrated in FIG. 3B.

In each case, the left and right light signals are focused at the plurality of user volumes. (Recall, e.g., FIG. 9.)

What is claimed is:

1. A panel display for providing glass-free, three dimensional (3D) display to a plurality of viewing volumes corresponding to a hypothetical plurality of viewers' eye aperture pairs the panel display comprising:
    a) an array of pixels defining a source of the 3D display, each of the pixels having left and right sub-pixels for each of a plurality of colors,
    b) means, for each of the left and right sub-pixels for each of the plurality of colors, for separating left and right image signals; and
    c) pitches-mutually-matched red-green-blue gratings multiplexing apparatus ("PMM-RGB-GMA"), for each and every one of the left and right sub-pixels for each of the plurality of colors, for multiplexing, using optical wave diffraction, the separated left and right signal to the plurality of viewing volumes, wherein (1) the left image is provided, focused, to a plurality of virtual volume apertures (VVA$_L$) containing positions corresponding to left eyes of the hypothetical plurality of viewers' eye aperture pairs, and (2) the right image is provided, focused, to a plurality of virtual volume apertures (VVA$_R$) containing positions of right eyes of the hypothetical plurality of viewers' eye aperture pairs, whereby (1) each and every left sub-pixel of the source of the 3D display is provided to each and every one of the virtual volume apertures (VVA$_L$) containing positions corresponding to left eyes of the hypothetical plurality of viewers' eye aperture pairs, and (2) each and every right sub-pixel of the source of the 3D display is provided to each and every one of the virtual volume apertures (VVA$_R$) containing positions corresponding to right eyes of the hypothetical plurality of viewers' eye aperture pairs; and
    wherein the displayed light signals to each and every left-side virtual volume apertures (VVA$_L$) and to each and every right-side virtual volume apertures (VVA$_R$) are all kept active simultaneously during all display times; and
    wherein each and every one of the left-side virtual volume apertures (VVA$_L$) and each and every one of the right-side virtual volume apertures (VVA$_R$) have a normalized cross-sectional power distribution function as POWER$(U,V)=(\text{SIN}(U)/U)^2(\text{SIN}(V)/V)^2$, whereby (U,V) are two linearly scaled coordinates that are proportional to the viewers' space linear coordinates (X$_v$,Y$_v$); and
    wherein each and every one of the left-side virtual volume apertures (VVA$_L$) and each and every one of the right-side virtual volume apertures (VVA$_R$) have a double-sized cross-sectional area ("DSCSA") of (2A$_x$×2A$_y$), whereby (1) linear space dimensions (2A$_x$ and 2A$_y$) are defined within the four-sides boundaries where the power distribution function (POWER(U,V)) encounters its first theoretical zero-crossings, and (2) maximum possible power distribution outside of "DSCSA" is less than or equal to 4.50% (=4/(9$\pi^2$), normalized); and
    wherein each and every one of the left-side virtual volume apertures (VVA$_L$) and each and every one of the right-side virtual volume apertures (VVA$_R$) have an effective cross-sectional area ("ECSA") of (A$_x$× A$_y$), whereby (1) linear space dimensions (A$_x$ and A$_y$) are defined by taking half-length of the double-sized cross-sectional area ("DSCSA"), and (2) maximum possible normalized power distribution outside of "ECSA" is less than or equal to 41% (=4/($\pi^2$), normalized).

2. The panel display of claim 1 wherein the means for separating include alternating wedges, wherein the resulting angle-of-partition between two separated left and right output beams ($\theta_{LCD}$) is determined by $\theta_{LCD}=(n-1)\varphi_{LCD}$, wherein n denotes refractive index of the transparent wedge material, and $\varphi_{LED/OFF}$ represents design value of the wedged angle.

3. The panel display of claim 2 wherein the surface gradient vector of the alternating wedges are aligned in a horizontal plane or a substantially horizontal plane.

4. The panel display of claim 1 wherein the means for separating include an off-axis LED light source provided in a sub-pixel, wherein the resulting angle-of-partition between two separated left and right output beams ($\theta_{LED/OFF}$) S determined by $\theta_{LED/OFF}=n\varphi_{LED/OFF}$ wherein n denotes refractive index of the transparent LED body material, and $\varphi_{LED/OFF}$ represents an input beam's off-axis angle.

5. The panel display of claim 4 wherein a beam axis of the off-axis LED light source is aligned in a horizontal plane or a substantially horizontal plane.

6. The panel display of claim 1 wherein the pitches-mutually-matched red-green-blue gratings multiplexing apparatus ("PMM-RGB-GMA") include three sets of red, or green, or blue ("RGB") gratings, wherein each set of the RGB gratings are deposited onto front faces of the red, or green, or blue ("RGB") subpixels, respectively, of the display panel.

7. The panel display of claim 6 wherein the three sets of RGB gratings are one-dimensional line-gratings, and the grating lines are straight, parallel, equally-spaced, and aligned in a vertical or substantially vertical direction.

8. The panel display of claim 6 wherein the three sets of RGB gratings are two-dimensional cross-gratings, and a first branch of grating lines are straight, parallel, equally-spaced, and aligned in a vertical or substantially vertical direction, and a second branch of grating lines are straight, parallel, equally-spaced, and aligned in a horizontal or substantially horizontal direction.

9. The panel display of claim 6 wherein the three sets of RGB gratings are amplitude-type gratings.

10. The panel display of claim 9 wherein a common duty cycle of the three sets of RGB amplitude-type gratings is selected to match a predetermined maximum supportable number of the hypothetical plurality of viewers.

11. The panel display of claim 6 wherein the three sets of RGB gratings are phase-type gratings.

12. The panel display of claim 11 wherein a peak-to-peak thickness of each set of the three sets of RGB phase-type gratings is selected to match a predetermined maximum supportable number of the hypothetical plurality of viewers.

13. The panel display of claim 6 wherein the three pitch values of three sets of RGB gratings are mutually matched by the following proportionally coordinated relationships, $$G_{RED}/\lambda_{RED}=G_{GREEN}/\lambda_{GREEN}=G_{BLUE}/\lambda_{BLUE},$$

wherein sign "/" represents ratio operation, $G_{RED}$, $G_{GREEN}$ and $G_{BLUE}$ denote grating pitch values built onto red, green and blue subpixels, respectively, and $\lambda_{RED}$, $\lambda_{GREEN}$ and $\lambda_{BLUE}$ denote optical wavelengths emitted from red, green and blue subpixels, respectively.

14. The panel display of claim 1 wherein the means for separating and the PMM-RGB-GMA are mutually selected such that no $VVA_L$ shares any volume with any $VVA_R$ at a given distance ($L_v$) from the display.

15. The panel display of claim 1 wherein a center point of a $VVA_L$ is separated from a center point of a corresponding $VVA_R$ by a distance of $D_{pp}=60$ mm±10%, wherein $D_{pp}$ is also referred to as inter-pupil distance between two eyes of an average person and the value of $D_{pp}$ is controlled by, $$D_{pp}=L_v\theta_{pp},$$

whereby $L_v$ denotes the distance between viewers and the display panel, $\theta_{pp}$ is angle-of-partition between two separated left and right light beams resulting from the means of separation, and the value of $D_{pp}$ satisfies ($D_{pp}\gg 2A_x$), such that any possible signal cross-talks between a pair of $VVA_L$ and $VVA_R$ is low and negligible.

16. The panel display of claim 1 wherein a center point of a $VVA_L$ or $VVA_R$ is separated from a center point of an adjacent $VVA_L$ or $VVA_R$ by $D_{vv}=0.50$ meters±10%, wherein $D_{vv}$ is also referred to as viewer-to-viewer distance between two adjacent spectators and the value of $D_{vv}$ is controlled by, $$D_{vv}=\lambda L_v/G,$$

Whereby $L_v$ denotes the distance between viewers and the display panel, and $\lambda$ is wavelength and G is grating pitch, both of a color-specific subpixel, and the value of $D_{vv}$ satisfies ($D_{vv}\gg 2D_{pp}$), such that any possible signal cross-talks between two adjacent viewers is low and negligible.

17. The panel display of claim 1 wherein the array of pixels includes LCD sub-pixels, each LCD pixel being back-illuminated via light emitting diodes (LED) or laser diodes (LD).

18. The panel display of claim 1 wherein the array of pixels includes self-sourcing LED sub-pixels, each LED pixel having a cross-sectional area that is circular, or rectangular, or hexagonal, or racetrack or D-shaped.

19. The panel display of claim 1 wherein the panel is spherical concave or piece-wise-flat spherical concave.

20. The panel display of claim 1 wherein the panel is flat and is accompanied by a focusing lens at its front-side.

21. The panel display of claim 20 wherein the focusing lens is a convex singlet, or a convex achromatic doublet, or a convex achromatic triplet, or a 2D Fresnel convex lens, or by means of two 1D cylindrical lens applied in tandem and having their cylindrical axes aligned in two orthogonal directions with respect to each other, or by means of two 1D Fresnel-style lenticulars applied in tandem and having their straight line grooves aligned in two orthogonal directions with respect to each other.

22. The panel display of claim 1 wherein the panel is concave cylindrical, having its cylindrical axis aligned in vertical (or horizontal) direction, and is accompanied by a 1D cylindrical lens having its cylindrical axis aligned in horizontal (or vertical) direction, or accompanied by a 1D Fresnel-style lenticular having straight line grooves aligned in horizontal (or vertical) direction.

23. A panel display for providing glass-free, three dimensional (3D) display to a plurality of viewing volumes corresponding to a hypothetical plurality of viewers' eye aperture pairs, the panel display comprising:
  a) an array of pixels defining a source of the 3D display, each of the pixels having left and right sub-pixels for each of a plurality of colors;
  b) pitches-mutually-matched red-green-blue gratings multiplexing apparatus ("PMM-RGB-GMA"), for each of the left and right sub-pixels for each of the plurality of colors, for multiplexing, using optical wave diffraction, signals of the sub-pixels to the plurality of viewing volumes; and
  c) means, for each of the left and right sub-pixels for each of the plurality of colors, for separating left and right image signals,
    wherein (1) the left image, including each and every left sub-pixel of the source of the 3D display, is provided, focused, to each and every one of a plurality of virtual volume apertures ($VVA_L$) containing positions corresponding to left eyes of the hypothetical plurality of viewers' eye aperture pairs, and (2) the right image, including each and every right sub-pixel of the source of the 3D display, is provided, focused, to each and every one of a plurality of virtual volume apertures ($VVA_R$) containing positions of right eyes of the hypothetical plurality of viewers' eye aperture pairs; and
    wherein the displayed light signals to each and every left-side virtual volume apertures ($VVA_L$) and to each and every right-side virtual volume apertures ($VVA_R$) are all kept active simultaneously during all display times; and
    wherein each and every one of the left-side virtual volume apertures ($VVA_L$) and each and every one of the right-side virtual volume apertures ($VVA_R$) have a normalized cross-sectional power distribution function as $$POWER(U,V)=(SIN(U)/U)^2(SIN(V)/V)^2,$$

whereby (U, V) are two linearly scaled coordinates that are proportional to the viewers' space linear coordinates ($X_v$, $Y_v$); and
    wherein each and every one of the left-side virtual volume apertures ($VVA_L$) and each and every one of the right-side virtual volume apertures ($VVA_R$) have a double-sized cross-sectional area ("DSCSA") of ($2A_x \times 2A_y$), whereby (1) linear space dimensions ($2A_x$ and $2A_y$) are defined within the four-sides boundaries where the power distribution function (POWER(U,V)) encounters its first theoretical zero-crossings, and (2) maximum possible power distribution outside of "DSCSA" is less than or equal to 4.50% ($=4/(9\pi^2)$, normalized); and
    wherein each and every one of the left-side virtual volume apertures ($VVA_L$) and each and every one of the right-side virtual volume apertures ($VVA_R$) have an effective cross-sectional area ("ECSA") of ($A_x \times A_y$), whereby (1) linear space dimensions ($A_x$ and $A_y$) are defined by taking half-length of the double-sized cross-sectional area ("DSCSA"), and (2) maximum possible normalized power distribution outside of "ECSA" is less than or equal to 41% ($=4/(\pi^2)$, normalized).

\* \* \* \* \*